United States Patent
Hottinen

(10) Patent No.: US 8,824,392 B2
(45) Date of Patent: Sep. 2, 2014

(54) APPARATUS AND METHOD TO ALLOCATE COMMUNICATION RESOURCES IN A COMMUNICATION SYSTEM

(75) Inventor: Ari T. Hottinen, Espoo (FI)

(73) Assignee: Nokia Corporation, Espoo (FI)

( * ) Notice: Subject to any disclaimer, the term of this patent is extended or adjusted under 35 U.S.C. 154(b) by 234 days.

(21) Appl. No.: 13/167,969

(22) Filed: Jun. 24, 2011

(65) Prior Publication Data

US 2012/0327865 A1    Dec. 27, 2012

(51) Int. Cl.
*H04W 4/00* (2009.01)
*H04W 72/02* (2009.01)
*H04W 72/04* (2009.01)

(52) U.S. Cl.
CPC .......... *H04W 72/02* (2013.01); *H04W 72/0453* (2013.01); *H04W 72/0413* (2013.01)
USPC .......................................................... 370/329

(58) Field of Classification Search
USPC .................................. 370/329, 335; 709/231
See application file for complete search history.

(56) References Cited

U.S. PATENT DOCUMENTS

| | | | | |
|---|---|---|---|---|
| 7,698,724 B1* | 4/2010 | Day | | 725/97 |
| 2008/0013490 A1* | 1/2008 | Laroia et al. | | 370/331 |
| 2008/0095122 A1* | 4/2008 | Khandekar et al. | | 370/335 |
| 2008/0101307 A1* | 5/2008 | Sindhushayana et al. | | 370/337 |
| 2009/0129268 A1* | 5/2009 | Lin et al. | | 370/231 |

OTHER PUBLICATIONS

Han, et al., "Fair Multiuser Channel Allocation for OFDMA Networks Using Nash Bargaining Solutions and Coalitions," published in the IEEE Transactions on Communications, vol. 53, No. 8, pp. 1366-1376, Aug. 2005.

Yu, et al., "FDMA Capacity of Gaussian Multiple-Access Channels with ISI," published in the IEEE Transactions on Communications, vol. 50, No. 1, pp. 102-111, Jan. 2002.

Dianati, et al., "A New Fairness Index for Radio Resource Allocation in Wireless Networks," published in the proceedings of the IEEE Wireless Communications and Networking Conference, vol. 2, pp. 712-717, Mar. 13-17, 2005.

Babu, et al., "Fairness Analysis of IEEE 802.11 Multirate Wireless LANs," published in the IEEE Transactions on Vehicular Technology, vol. 56, No. 5, pp. 3073-3088, Sep. 2007.

Zhou, et al., "Fulfillment-Based Fairness: A New Fairness Notion for Multi-AP Wireless Hotspots," published in the proceedings of the IEEE International Conference on Communications, pp. 4791-4796, Jun. 24-28, 2007.

* cited by examiner

*Primary Examiner* — Wei Zhao
(74) *Attorney, Agent, or Firm* — Squire Patton Boggs (US) LLP

(57) ABSTRACT

An apparatus, method and system configured to allocate communication resources in a communication system. An apparatus includes a processor and memory including computer program code configured to cause the apparatus to arrange a number of sub-channels in a sequence according to an index configured to at least one user equipment. A first segment information is received from a first user equipment to partition the number of sub-channels into first and second user-defined segments. A first segment information is received from a second user equipment to partition the number of sub-channels into first and second user-defined segments. The memory and the computer program code are further configured to, with the processor, cause the apparatus to configure sub-channels dependent on the first user-defined segment to the first user equipment when the first segment information therefrom is lower than the first segment information from the second user equipment.

20 Claims, 17 Drawing Sheets

APPARATUS AND METHOD TO ALLOCATE COMMUNICATION RESOURCES IN A COMMUNICATION SYSTEM

TECHNICAL FIELD

The present invention is directed, in general, to communication systems and, in particular, to an apparatus, method and system configured to allocate communication resources in a communication system.

BACKGROUND

Long term evolution ("LTE") of the Third Generation Partnership Project ("3GPP"), also referred to as 3GPP LTE, refers to research and development involving the 3GPP LTE Release 8 and beyond as part of an ongoing effort across the industry aimed at identifying technologies and capabilities that can improve systems such as the universal mobile telecommunication system ("UMTS"). The notation "LTE-A" is generally used in the industry to refer to further advancements in LTE. The goals of this broadly based project include improving communication efficiency, lowering costs, improving services, making use of new spectrum opportunities, and achieving better integration with other open standards.

The evolved universal terrestrial radio access network ("E-UTRAN") in 3GPP includes base stations providing user plane (including packet data convergence protocol/radio link control/media access control/physical ("PDCP/RLC/MAC/PHY") sublayers) and control plane (including radio resource control ("RRC") sublayer) protocol terminations towards wireless communication devices such as cellular telephones. A wireless communication device or terminal is generally known as user equipment (also referred to as "UE"). A base station is an entity of a communication system or network often referred to as a Node B or an NB. Particularly in the E-UTRAN, an "evolved" base station is referred to as an eNodeB or an eNB. For details about the overall architecture of the E-UTRAN, see 3GPP Technical Specification ("TS") 36.300 v8.7.0 (2008-12), which is incorporated herein by reference. For details of the radio resource control management, see 3GPP TS 25.331 v.9.1.0 (2009-12) and 3GPP TS 36.331 v.9.1.0 (2009-12), which are incorporated herein by reference.

As wireless communication systems such as cellular telephone, satellite, and microwave communication systems become widely deployed and continue to attract a growing number of users, there is a pressing need to accommodate a large and variable number of communication devices that transmit an increasing quantity of data within a fixed spectral allocation and limited transmit power. The increased quantity of data is a consequence of wireless communication devices transmitting video information and surfing the Internet, as well as performing ordinary voice communication. The aforementioned services are provided while accommodating substantially simultaneous operation of a large number of wireless communication devices. Accordingly, there is a need to efficiently utilize the limited communication resources of a wireless communication system.

Thus, allocation of communication channel resources is a fundamental problem in communication systems. Many centralized communication systems attempt to provide fair communication channel allocation, for example, by using a centralized scheduler in third generation ("3G") LTE systems. Many future communication systems are decentralized and, in such decentralized communication systems, the role of a centralized planner or scheduler is smaller. Even in centralized communication systems, the preferences of individual sources or services may only be known by the individual sources or services themselves, and are not revealed to a centralized planner or scheduler.

An important consideration for allocation of sub-channels in a communication system to various communication nodes that attempt to communicate concurrently through a network element such as an access point (or base station) is that each communication node obtains a fair proportion of spectrum or time (or both). The process for allocation of sub-channels or other communication resources should remain simple and efficient and, ideally, there should not be a need to signal individual communication node preferences to an external source such as a centralized planner or scheduler. Thus, an unresolved issue in communication systems and other information networks is how to efficiently manage allocation of sub-channels therein taking into account the needs and preferences of communication nodes such as user equipment in the communication systems.

SUMMARY OF THE INVENTION

These and other problems are generally solved or circumvented, and technical advantages are generally achieved, by embodiments of the present invention, which include an apparatus, method and system configured to allocate communication resources in a communication system. In one embodiment, an apparatus includes a processor and memory including computer program code configured to cause the apparatus to arrange a number of sub-channels in a sequence according to an index allocable to at least one user equipment, receive first segment information from a first user equipment to partition the number of sub-channels into first and second user-defined segments, receive first segment information from a second user equipment to partition the number of sub-channels into first and second user-defined segments, and receive first segment information from a third user equipment to partition the number of sub-channels into first and second user-defined segments. The memory and the computer program code are further configured to, with the processor, cause the apparatus to allocate sub-channels dependent on the first user-defined segment to the first user equipment when the first segment information therefrom is lower than the first segment information from the second and third user equipment.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. In view of the foregoing, the present invention will be described with respect to exemplary embodiments in a specific context of an apparatus, method and system for allocation of sub-channels in a communication system so that each of a plurality of nodes (such as user equipment) obtains a fair proportion of spectrum or time (or both) advantageously without the need for the communication nodes to transmit a priority structure to a central location. The apparatus, method and system are applicable, without limitation, to any communication system including existing and future cellular technologies including 3GPP technologies (i.e., UMTS, LTE, and future variants such as 4th generation ("4G") communication systems) and a wireless local area network ("WLAN") operable under IEEE standard 802.11 (or a worldwide interoperability for microwave access ("WiMAX") communication system operable under IEEE standard 802.16). Additionally, WLAN communications, communication systems, modules, modes or the like generally include non-cellular equivalents such as, without limitation, technologies related to WiMAX, WiFi, industrial, scientific and medical ("ISM"), global positioning system ("GPS") and Bluetooth.

Figure 1:
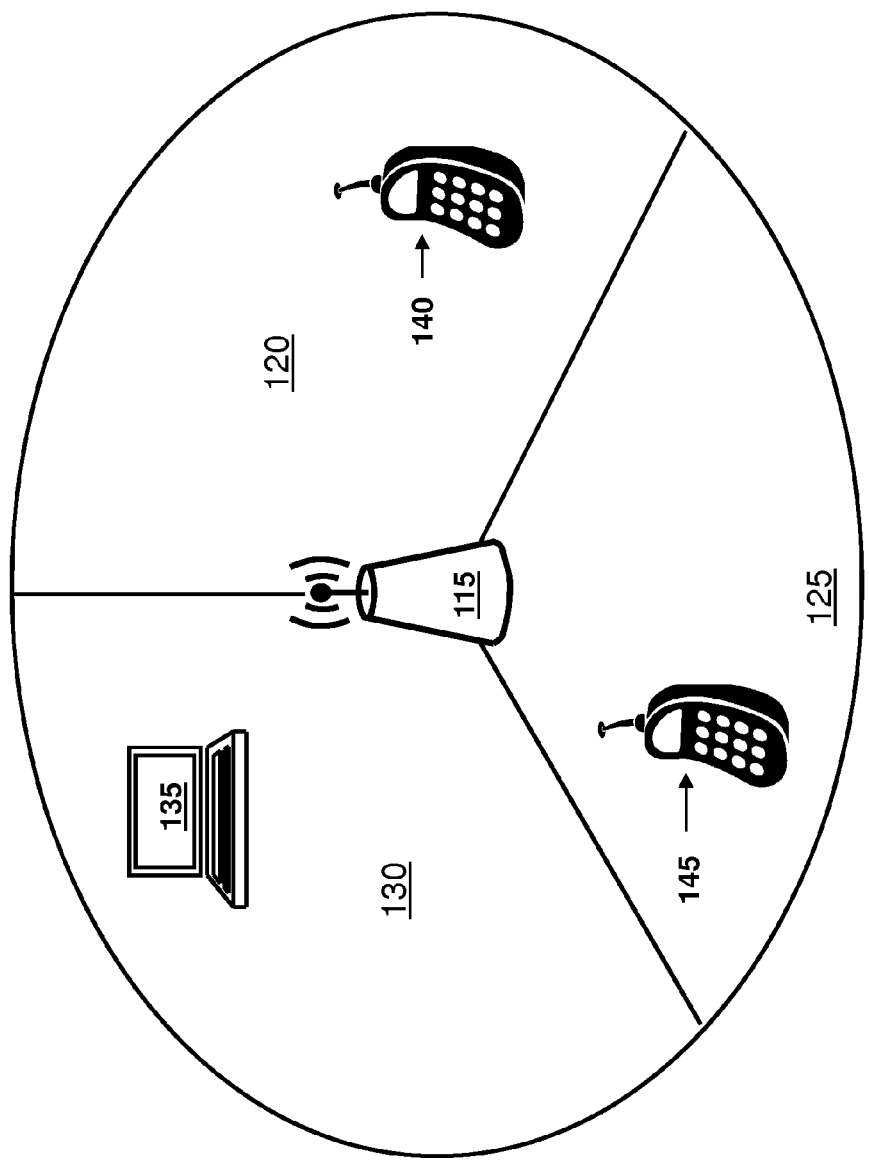
FIGS. 1 and 2 illustrate system level diagrams of embodiments of communication systems including a base station and wireless communication devices that provide an environment for application of the principles of the present invention.

Turning now to FIG. 1, illustrated is a system level diagram of an embodiment of a communication system including a base station 115 and wireless communication devices (e.g., user equipment) 135, 140, 145 that provides an environment for application of the principles of the present invention. The base station 115 is coupled to a public switched telephone network (not shown). The base station 115 is configured with a plurality of antennas to transmit and receive signals in a plurality of sectors including a first sector 120, a second sector 125, and a third sector 130, each of which typically spans 120 degrees. Although FIG. 1 illustrates one wireless communication device (e.g., wireless communication device 140) in each sector (e.g. the first sector 120), a sector (e.g. the first sector 120) may generally contain a plurality of wireless communication devices. In an alternative embodiment, a base station 115 may be formed with only one sector (e.g. the first sector 120), and multiple base stations may be constructed to transmit according to co-operative multi-input/multi-output ("C-MIMO") operation, etc.

The sectors (e.g. the first sector 120) are formed by focusing and phasing radiated signals from the base station antennas, and separate antennas may be employed per sector (e.g. the first sector 120). The plurality of sectors 120, 125, 130 increases the number of subscriber stations (e.g., the wireless communication devices 135, 140, 145) that can simultaneously communicate with the base station 115 without the need to increase the utilized bandwidth by reduction of interference that results from focusing and phasing base station antennas. While the wireless communication devices 135, 140, 145 are part of a primary communication system, the wireless communication devices 135, 140, 145 and other devices such as machines (not shown) may be a part of a secondary communication system to participate in, without limitation, device-to-device and machine-to-machine communications or other communications.

Figure 2:
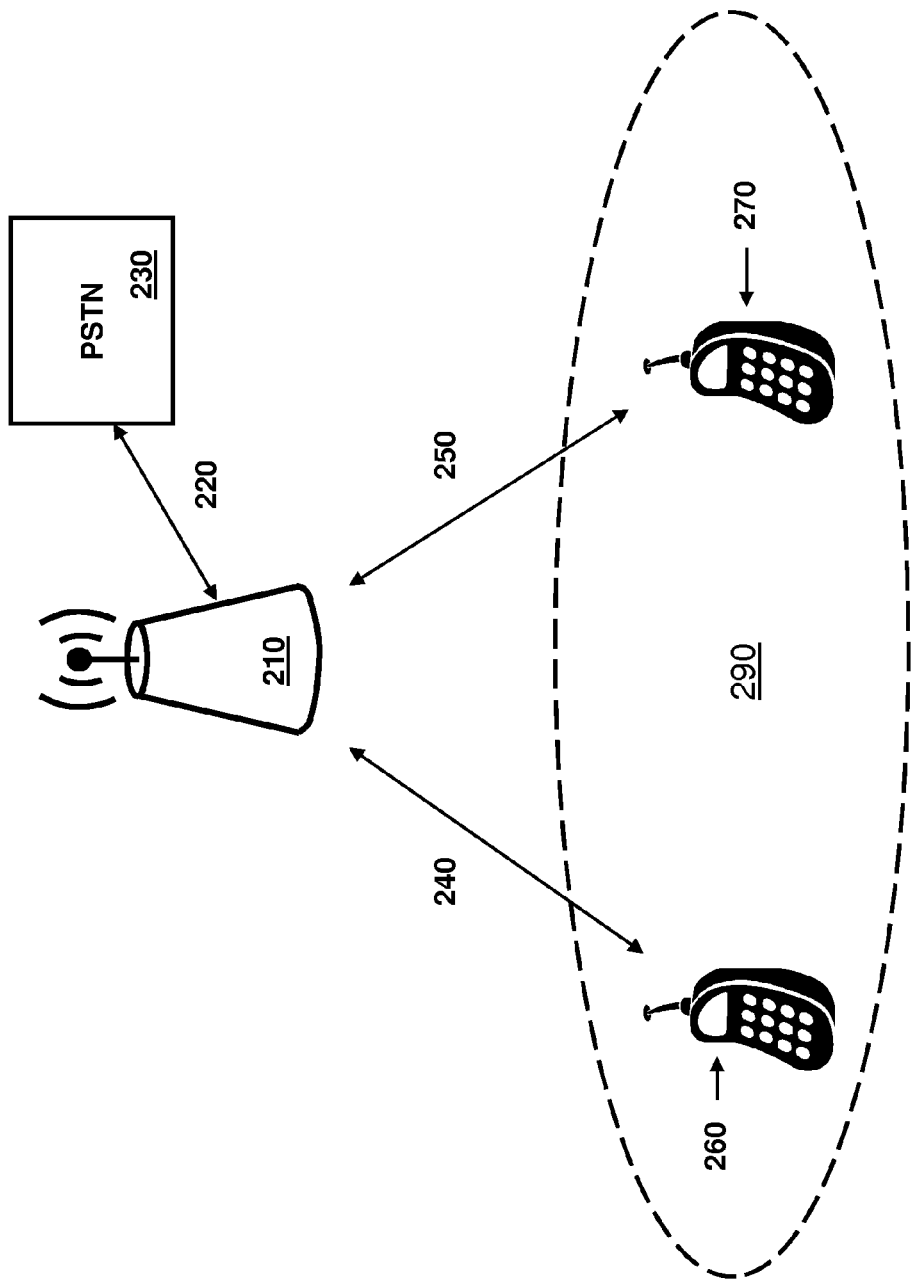

Turning now to FIG. 2, illustrated is a system level diagram of an embodiment of a communication system including a base station 210 and wireless communication devices (e.g., user equipment) 260, 270 that provides an environment for application of the principles of the present invention. The communication system includes the base station 210 coupled by communication path or link 220 (e.g., by a fiber-optic communication path) to a core telecommunications network such as public switched telephone network ("PSTN") 230. The base station 210 is coupled by wireless communication paths or links 240, 250 to the wireless communication devices 260, 270, respectively, that lie within its cellular area 290.

In operation of the communication system illustrated in FIG. 2, the base station 210 communicates with each wireless communication device 260, 270 through control and data communication resources allocated by the base station 210 over the communication paths 240, 250, respectively. The control and data communication resources may include frequency and time-slot communication resources in frequency division duplex ("FDD") and/or time division duplex ("TDD") communication modes. While the wireless communication devices 260, 270 are part of a primary communication system, the wireless communication devices 260, 270 and other devices such as machines (not shown) may be a part of a secondary communication system to participate in, without limitation, device-to-device and machine-to-machine communications or other communications.

Figure 3:
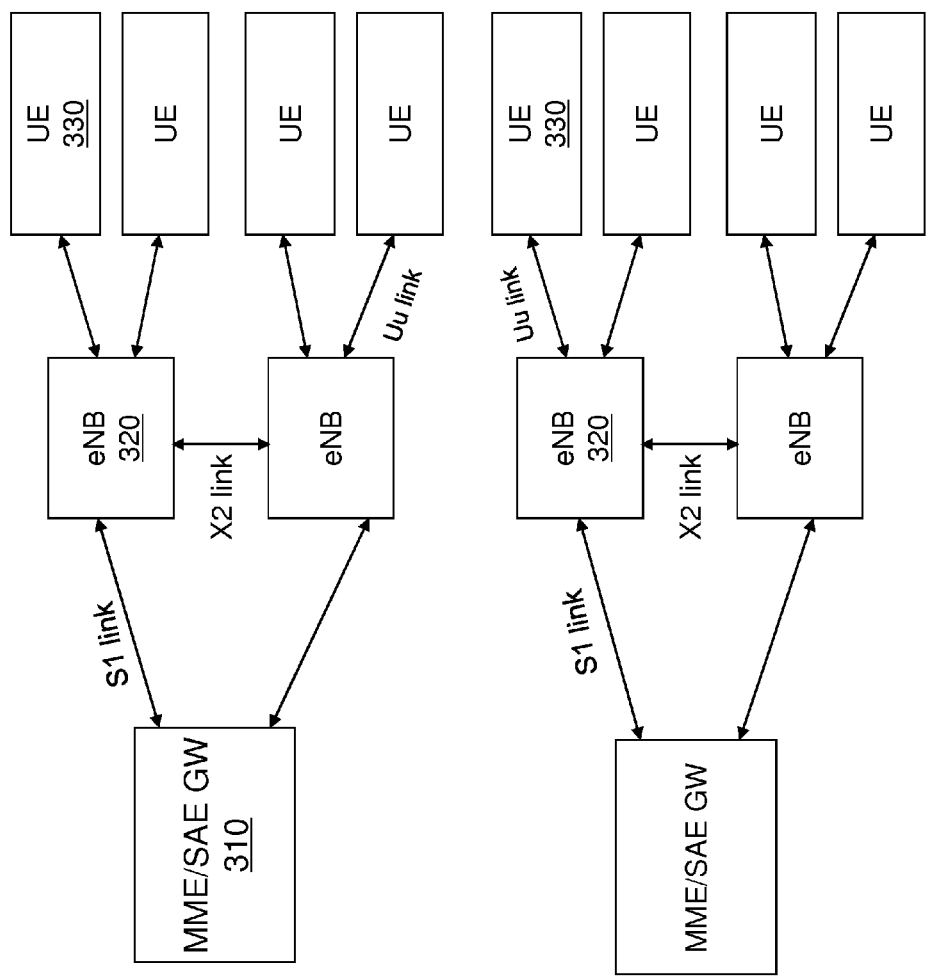
FIGS. 3 to 5 illustrate system level diagrams of embodiments of communication systems including wireless communication systems that provide an environment for application of the principles of the present invention.

Turning now to FIG. 3, illustrated is a system level diagram of an embodiment of a communication system including a wireless communication system that provides an environment for the application of the principles of the present invention. The wireless communication system may be configured to provide evolved UMTS terrestrial radio access network ("E-UTRAN") universal mobile telecommunications services. A mobile management entity/system architecture evolution gateway ("MME/SAE GW," one of which is designated 310) provides control functionality for an E-UTRAN node B (designated "eNB," an "evolved node B," also referred to as a "base station," one of which is designated 320) via an S1 communication link (ones of which are designated "S1 link"). The base stations 320 communicate via X2 communication links (ones of which are designated "X2 link"). The various communication links are typically fiber, microwave, or other high-frequency metallic communication paths such as coaxial links, or combinations thereof.

The base stations 320 communicate with wireless communication devices such as user equipment ("UE," ones of which are designated 330), which is typically a mobile transceiver carried by a user. Thus, communication links (designated "Uu" communication links, ones of which are designated "Uu link") coupling the base stations 320 to the user equipment 330 are air links employing a wireless communication signal such as, for example, an orthogonal frequency division multiplex ("OFDM") signal. While the user equipment 330 are part of a primary communication system, the user equipment 330 and other devices such as machines (not shown) may be a part of a secondary communication system to participate in, without limitation, device-to-device and machine-to-machine communications or other communications.

Figure 4:
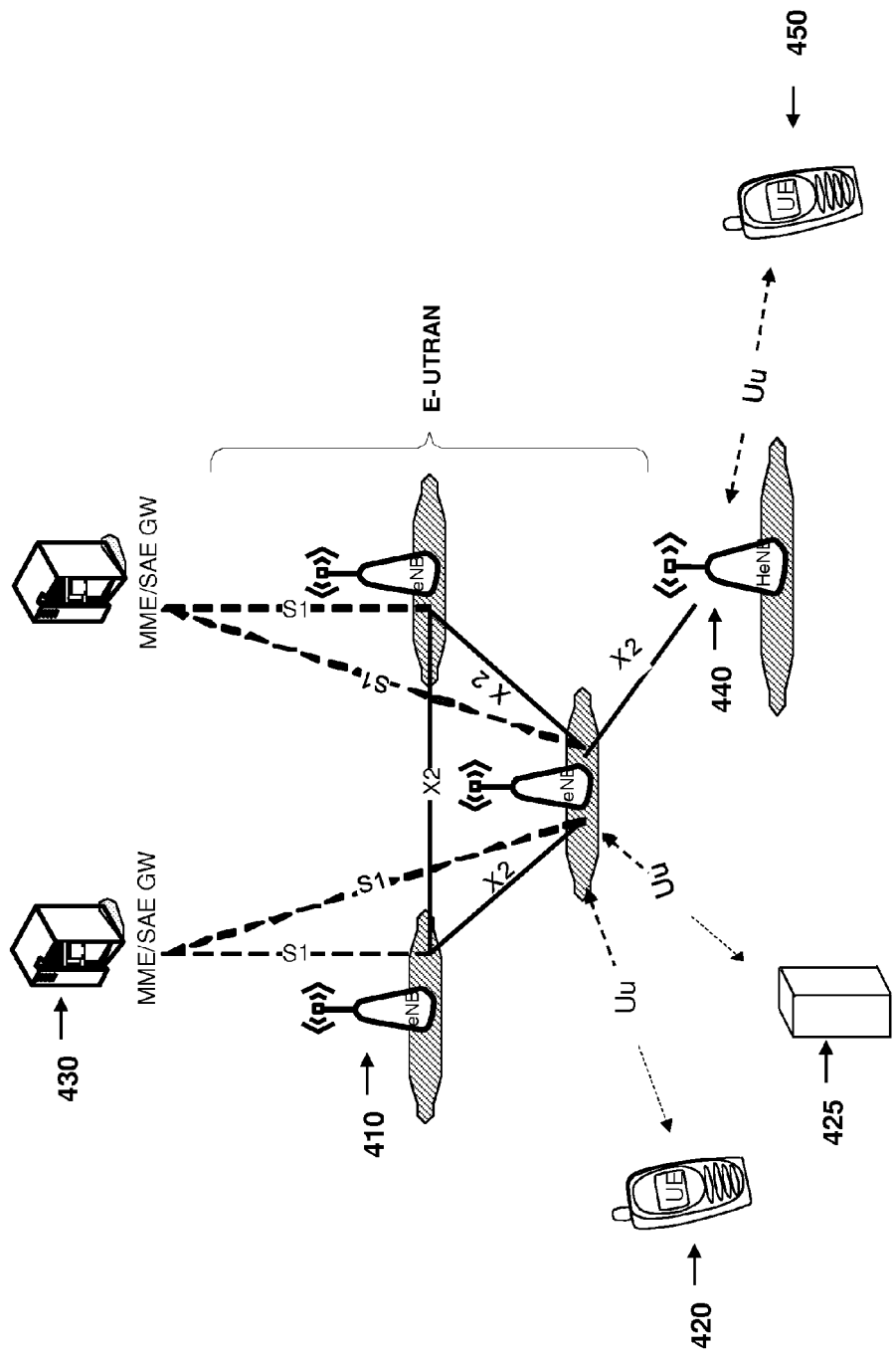

Turning now to FIG. 4, illustrated is a system level diagram of an embodiment of a communication system including a wireless communication system that provides an environment for the application of the principles of the present invention. The wireless communication system provides an E-UTRAN architecture including base stations (one of which is designated 410) providing E-UTRAN user plane (packet data convergence protocol/radio link control/media access control/physical) and control plane (radio resource control) protocol terminations towards wireless communication devices such as user equipment 420 and other devices such as machines 425 (e.g., an appliance, television, meter, etc.). The base stations 410 are interconnected with X2 interfaces or communication links (designated "X2"). The base stations 410 are also connected by S1 interfaces or communication links (designated "S1") to an evolved packet core ("EPC") including a mobile management entity/system architecture evolution gateway ("MME/SAE GW," one of which is designated 430). The S1 interface supports a multiple entity relationship between the mobile management entity/system architecture evolution gateway 430 and the base stations 410. For applications supporting inter-public land mobile handover, inter-eNB active mode mobility is supported by the mobile management entity/system architecture evolution gateway 430 relocation via the S1 interface.

The base stations 410 may host functions such as radio resource management. For instance, the base stations 410 may perform functions such as internet protocol ("IP") header compression and encryption of user data streams, ciphering of user data streams, radio bearer control, radio admission control, connection mobility control, dynamic allocation of communication resources to user equipment in both the uplink and the downlink, selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobile management entity/system architecture evolution gateway 430 may host functions such as distribution of paging messages to the base stations 410, security control, termination of user plane packets for paging reasons, switching of the user plane for support of the user equipment mobility, idle state mobility control, and system architecture evolution bearer control. The user equipment 420 and machines 425 receive an allocation of a group of information blocks from the base stations 410.

Additionally, the ones of the base stations 410 are coupled to a home base station 440 (a device), which is coupled to devices such as user equipment 450 and/or machines (not shown) for a secondary communication system. The base station 410 can allocate secondary communication system resources directly to the user equipment 420 and machines 425, or to the home base station 440 for communications (e.g., local communications) within the secondary communication system. For a better understanding of home base stations (designated "HeNB"), see 3 GPP TS 32.871 v.9.1.0 (2010-03), which is incorporated herein by reference. While the user equipment 420 and machines 425 are part of a primary communication system, the user equipment 420, machines 425 and home base station 440 (communicating with other user equipment 450 and machines (not shown)) may be a part of a secondary communication system to participate in, without limitation, device-to-device and machine-to-machine communications or other communications.

Figure 5:
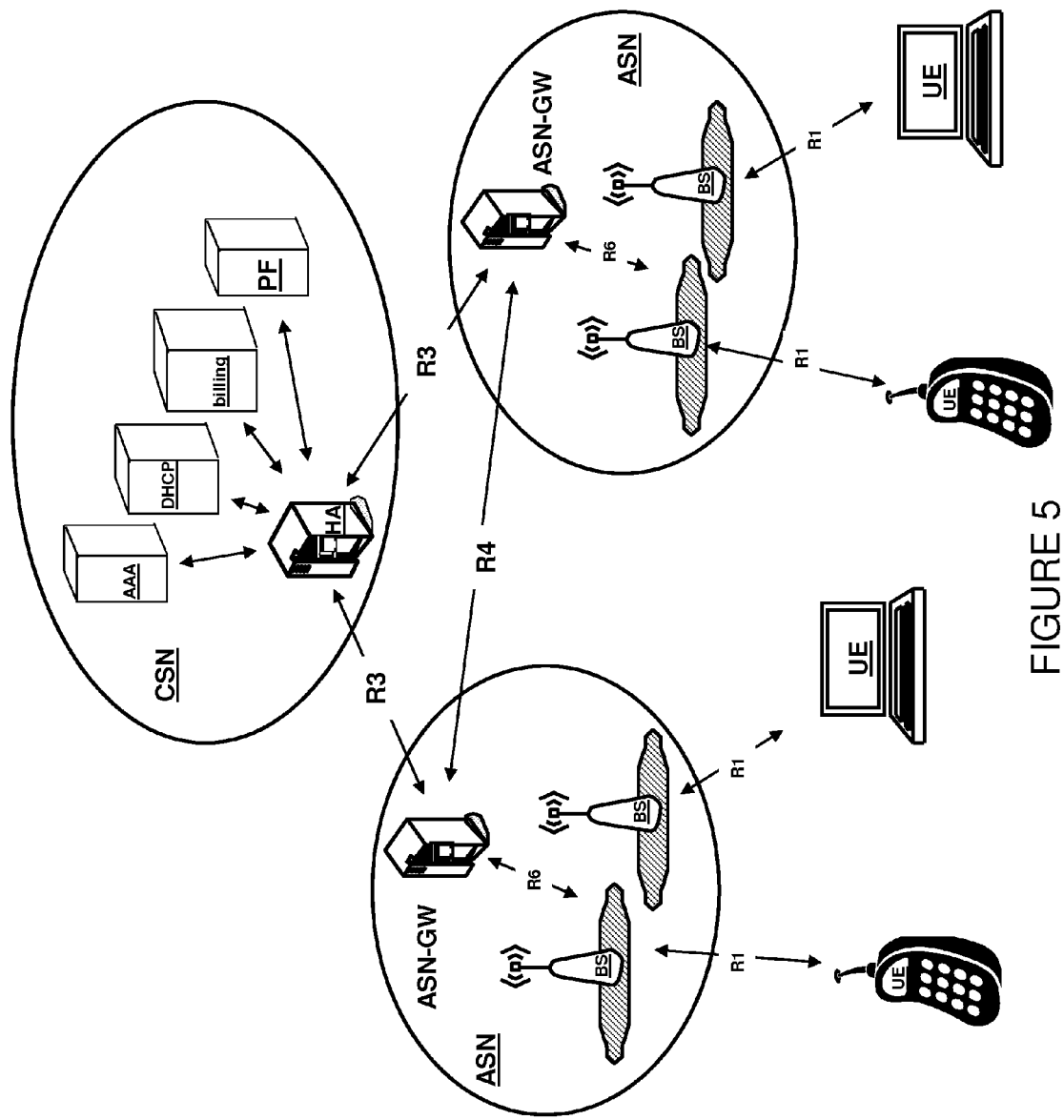

Turning now to FIG. 5, illustrated is a system level diagram of an embodiment of a communication system including a wireless communication system that provides an environment for the application of the principles of the present invention. The illustrated embodiment provides a communication system such as a WiMAX communication system typically configured according to IEEE standard 802.16. The WiMAX communication system includes a core service network ("CSN") including a home access ("HA") server. The core service network provides authentication, authorization, and accounting ("AAA") functions via an AAA server, dynamic host configuration protocol ("DHCP") functions via a DHCP server, billing functions via a billing server, and a policy function ("PF") server. The AAA server validates user credentials, determines functions permissible under a given set of operating conditions and tracks network utilization for billing and other purposes. The DHCP server is used to retrieve network configuration information such as Internet protocol address assignments. The policy function server coordinates various network resources to provide requested services to authorized subscribers, and is responsible for identifying policy rules for a service that a subscriber may intend to use.

The WiMAX communication system further includes access service networks ("ASNs") that include ASN gateways ("ASN-GWs") and base stations ("BSs") that provide wireless communication with user equipment ("UE"). A home access server communicates with the access service networks over R3 interfaces, and the ASN-GWs communicate with other ASN-GWs over R4 interfaces. The ASN-GWs communicate with base stations over R6 interfaces. The base stations communicate with the user equipment over wireless R1 interfaces.

Figure 6:
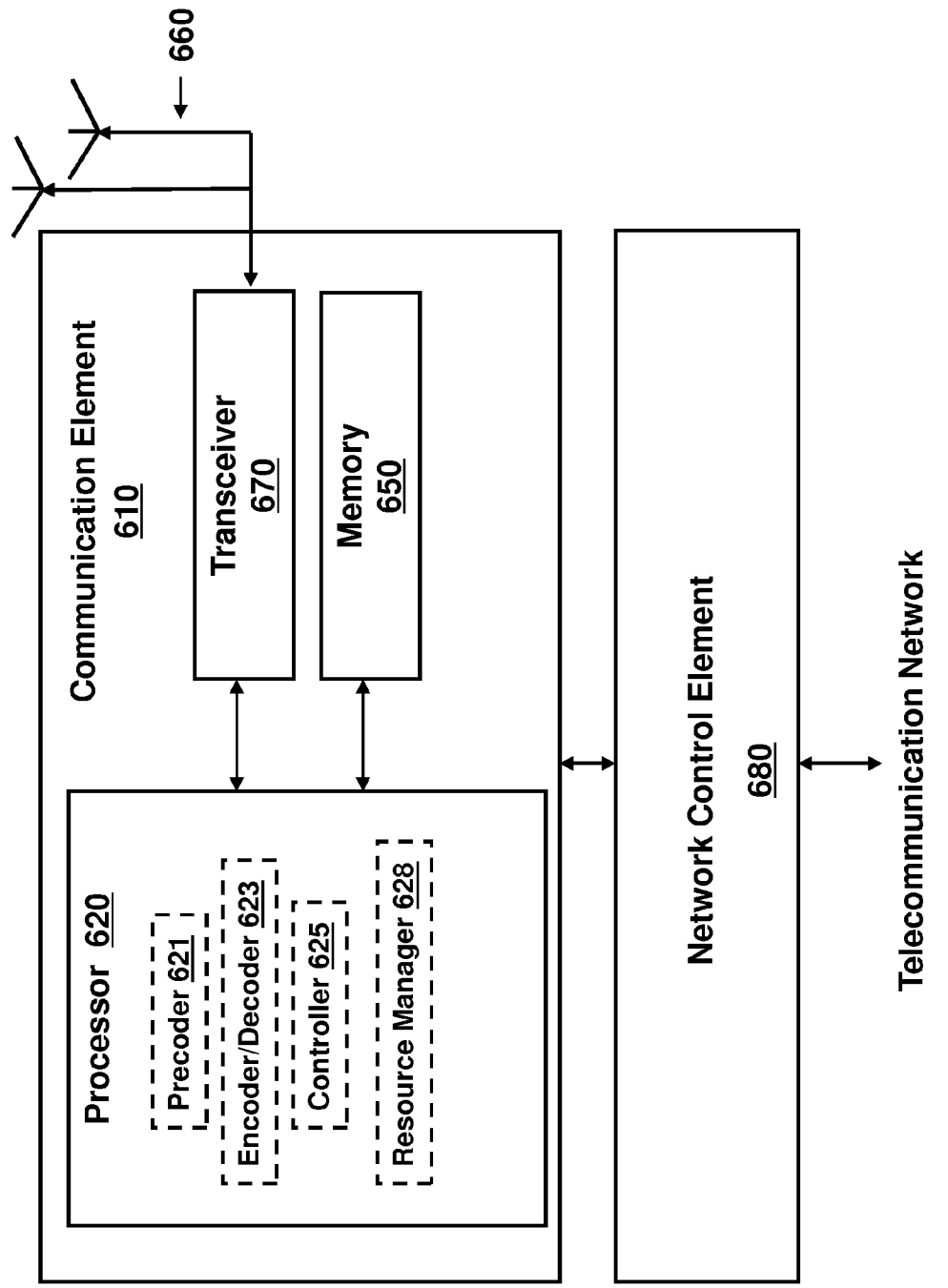
FIG. 6 illustrates a system level diagram of an embodiment of a communication element of a communication system for application of the principles of the present invention.

Turning now to FIG. 6, illustrated is a system level diagram of an embodiment of a communication element 610 of a communication system for application of the principles of the present invention. The communication element or device 610 may represent, without limitation, a base station, a wireless communication device (e.g., a subscriber station, terminal, mobile station, user equipment, machine), a network control element, a communication node, or the like. The communication element 610 includes, at least, a processor 620, memory 650 that stores programs and data of a temporary or more permanent nature, an antenna 660, and a radio frequency transceiver 670 coupled to the antenna 660 and the processor 620 for bidirectional wireless communication. The communication element 610 may provide point-to-point and/or point-to-multipoint communication services.

The communication element 610, such as a base station in a cellular network, may be coupled to a communication network element, such as a network control element 680 of a public switched telecommunication network ("PSTN"). The network control element 680 may, in turn, be formed with a processor, memory, and other electronic elements (not shown). The network control element 680 generally provides access to a telecommunication network such as a PSTN. Access may be provided using fiber optic, coaxial, twisted pair, microwave communication, or similar link coupled to an appropriate link-terminating element. A communication element 610 formed as a wireless communication device is generally a self-contained device intended to be carried by an end user.

The processor 620 in the communication element 610, which may be implemented with one or a plurality of processing devices, performs functions associated with its operation including, without limitation, precoding of antenna gain/phase parameters (precoder 621), encoding and decoding (encoder/decoder 623) of individual bits forming a communication message, formatting of information, and overall control (controller 625) of the communication element, including processes related to management of communication resources (resource manager 628). Exemplary functions related to management of communication resources include, without limitation, hardware installation, traffic management, performance data analysis, tracking of end users and equipment, configuration management, end user administration, management of wireless communication devices, management of tariffs, subscriptions, security, billing and the like. For instance, in accordance with the memory 650, the resource manager 628 is configured to allocate communication resources (e.g., time and frequency communication resources) for transmission of voice communications and data to/from the communication element 610 and to format messages including the communication resources therefor in a communication system.

When the communication element 610 is operable as a base station, the processor 620 (e.g., resource manager 628) in accordance with the memory 650 is configured to arrange a number of sub-channels in a sequence according to an index allocable to at least one of a first user equipment and a second user equipment, receive segment information to partition the number of sub-channels into a first user equipment-first user-defined segment and a first user equipment-second user-defined segment from the first user equipment, and receive segment information to partition the number of sub-channels into a second user equipment-first user-defined segment and a second user equipment-second user-defined segment from the second user equipment. The processor 620 in accordance with the memory 650 is configured to allocate sub-channels dependent on at least one of the first user equipment-first user-defined segment and the first user equipment-second user-defined segment to the first user equipment, and allocate sub-channels dependent on at least one of the second user equipment, first user-defined segment and the second user equipment, second user-defined segment to the second user equipment. In an exemplary embodiment, at least one of the first user equipment-first user-defined segment, the first user equipment-second user-defined segment, the second user equipment-first user-defined segment and the second user equipment-second user-defined segment includes a different number of sub-channels.

In one embodiment, when the first user equipment-first user-defined segment includes fewer sub-channels than the second user equipment-first user-defined segment, the processor 620 in accordance with the memory 650 is configured to allocate sub-channels dependent on the first user equipment-first user-defined segment to the first user equipment and thereafter remove the first user equipment-first user-defined segment from the number of sub-channels. In another embodiment, when the first user equipment-first user-defined segment includes fewer sub-channels than the first user equipment-second user-defined segment, the second user equipment-first user-defined segment, and the second user equipment-second user-defined segment, the processor 620 in accordance with the memory 650 is configured to allocate sub-channels dependent on the first user equipment-first user-defined segment to the first user equipment, and rearrange a remaining number of sub-channels in a sequence according to an index after removing the sub-channels allocated to the first user equipment-first user-defined segment. In yet another embodiment, the processor 620 in accordance with the memory 650 is configured to receive segment information to partition the number of sub-channels into at least one additional segment for the first user equipment and the second user equipment and allocate at least one additional segment to one of the first user equipment and the second user equipment.

In the environment of a plurality of user equipment, the processor 620 in accordance with the memory 650 is configured to receive first segment information (e.g., a first marker) and second segment information (e.g., a second marker) to partition the number of sub-channels into a first user equipment-first user-defined segment, a first user equipment-second user-defined segment and a first user equipment-third user-defined segment from the first user equipment, receive first segment information (e.g., a first marker) and second segment information (e.g., a second marker) to partition the number of sub-channels into a second user equipment-first user-defined segment, a second user equipment-second user-defined segment and a second user equipment-third user-defined segment from a second user equipment, and receive first segment information (e.g., a first marker) and second segment information (e.g., a second marker) to partition the number of sub-channels into a third user equipment-first user-defined segment, a third user equipment-second user-defined segment and a third user equipment-third user-defined segment from a third user equipment. The processor 620 in accordance with the memory 650 is configured to allocate sub-channels dependent on the first user equipment-first user-defined segment to the first user equipment when the first marker therefrom is lower than the first marker from the second user equipment and the first marker from the third user equipment, and allocate sub-channels dependent on the second user equipment-second user-defined segment to the second user equipment when the second marker therefrom is lower than the second marker from the third user equipment. The processor 620 in accordance with the memory 650 is configured to allocate sub-channels dependent on the third user equipment-third user-defined segment to the third user equipment.

Further in the environment of a plurality of user equipment, the processor 620 in accordance with the memory 650 is configured to arrange a number of sub-channels in a sequence according to an index allocable to at least one of a first user equipment, a second user equipment and a third user equipment, receive first segment information from the first user equipment to partition the number of sub-channels into a first user equipment-first user-defined segment and a first user equipment-second user-defined segment, receive first segment information from the second user equipment to partition the number of sub-channels into a second user equipment-first user-defined segment and a second user equipment-second user-defined segment, and receive first segment information from the third user equipment to partition the number of sub-channels into a third user equipment-first user-defined segment and a third user equipment-second user-defined segment. The processor 620 in accordance with the memory 650 is further configured to allocate sub-channels dependent on the first user equipment-first user-defined segment to the first user equipment when the first segment information therefrom is lower (or smaller number of sub-channels) than the first segment information from the second user equipment and the first segment information from the third user equipment.

Thereafter, the processor 620 in accordance with the memory 650 is further configured to arrange a number of remaining sub-channels in a sequence according to an index allocable to at least one of the second user equipment and the third user equipment, receive second segment information from the second user equipment to partition the number of remaining sub-channels into another second user equipment-first user-defined segment and another second user equipment-second user-defined segment, and receive second segment information from the third user equipment to partition the number of remaining sub-channels into another third user equipment-first user-defined segment and another third user equipment-second user-defined segment. The processor 620 in accordance with the memory 650 is further configured to allocate the remaining sub-channels dependent on the another second user equipment-first user-defined segment to the second user equipment when the second segment information therefrom is lower (or smaller number of sub-channels) than the second segment information from the third user equipment. This communication system performs an iterative process to allocate sub-channels to user equipment by receiving first segment information from a plurality of user equipment, allocating sub-channels to one user equipment pertaining to respective user-defined segments, re-indexing the remaining sub-channels with the allocated sub-channels (and user-defined segments for the allocated user equipment) removed from the next iteration, and requesting second segment information from the remaining user equipment to allocate sub-channels thereto based on the new user-defined segments.

When the communication element 610 is operable as a user equipment, the processor 620 (e.g., resource manager 628) in accordance with the memory 650 is configured to receive a number of sub-channels and segments allocable to the user equipment, partition the number of sub-channels into a first user-defined segment and a second user-defined segment, and provide segment information that indicates the partition into the first user-defined segment and the second user-defined segment. The number of sub-channels may be partitioned according to a priority or preference thereof and the priority or preference may be a function of processed sub-channel characteristics. The processed sub-channel characteristics may include a performance indicator of the number of sub-channels. Also, the segment information may include an additional number of segments to partition the number of sub-channels. Sub-channel characteristics may include a model of channel parameters, and interference environment and functions thereof. For example, channel characteristics may be linked to communication resources available to a given user equipment, such as encoding and modulation parameters that can be used with given sub-channel characteristics, maximum achievable rate with given transmit power or energy, or minimum power or energy needed by the user equipment to achieve a given rate or quality-of-service. Thus, performance indicators can be channel quality indicators (e.g., those defined in 3GPP LTE), signal-to-noise-and interference ratios, channel capacity or throughput, etc. computed for sub-channels of interest (e.g., for collections of time/frequency slots that may form a sub-channel(s)). These are examples of parameters that can be used to define priority, preference, or utility of sub-channels, for the purpose of determining segment information, segment lengths, or marker positions.

The execution of all or portions of particular functions or processes related to management of communication resources may be performed in equipment separate from and/or coupled to the communication element 610, with the results of such functions or processes communicated for execution to the communication element 610. The processor 620 of the communication element 610 may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The transceiver 670 of the communication element 610 modulates information on to a carrier waveform for transmission by the communication element 610 via the antenna(s) 660 to another communication element. The transceiver 670 demodulates information received via the antenna(s) 660 for further processing by other communication elements. The transceiver 670 is capable of supporting duplex operation for the communication element 610. It should be understood that the transceiver 670 may handle different types of communications (such as a cellular communication and a WLAN communication) or the communication element 610 may include multiple transceivers, wherein each transceiver handles a different type of communication.

The memory 650 of the communication element 610, as introduced above, may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 650 may include program instructions or computer program code that, when executed by an associated processor, enable the communication element 610 to perform tasks as described herein. Of course, the memory 650 may form a data buffer for data transmitted to and from the communication element 610. Exemplary embodiments of the system, subsystems, and modules as described herein may be implemented, at least in part, by computer software executable by processors of, for instance, the wireless communication device and the base station, or by hardware, or by combinations thereof. The systems, subsystems and modules may be embodied in the communication element 610 as illustrated and described herein.

A process is introduced herein for allocation of sub-channels or other communication resources in a communication system in which a plurality of communication nodes such as user equipment (K user equipment) attempt to access a channel formed with N communication channel resources. The parameter N represents the number of time or frequency slots to be allocated and is typically substantially larger than the parameter K that represents the number of user equipment. The objective is to allocate the N communication channel resources among the K user equipment so that each user equipment obtains a fair share without the need to signal communication channel states to a scheduling unit within an access point ("AP") or base station. The communication channel resources are typically sub-channels. The process may employ segment information such as method of markers, which provides a fair division of a limited communication resource among a plurality of user equipment.

As an example, the process begins with a number of sub-channels (or other communication resources) being allocated in consecutive and linear order from 1 to N, wherein the parameter N can represent frequency segments, time slots, etc. Each of the K user equipment attempting to access the sub-channels partitions the sub-channels, sometimes subjectively, but according to their own priority (or preference) into K consecutive segments of one or more sub-channels that are of equal or preferred value to the particular user equipment. Each user-defined segment is considered fair by the respective user equipment. The segments can be identified by segment information such as K−1 markers that partition the sub-channels into the K consecutive segments. Note that there are also different ways of designating the segment information other than markers. For example, segments can be designated using run-length-encoding, or any other coding scheme. Furthermore, the user equipment may determine their segment information using different criteria, one user equipment may determine the segments based on maximizing channel capacity and another user equipment may determine the segments by minimizing energy consumption for fixed number transmitted bits or for fixed throughput using any transmission scheme. In this process, there is no need for a centralized (or decentralized) scheduler to know why a particular user equipment designates given segments, and there is no need for a particular user equipment to know preferences of other user equipment.

In a downlink for a frequency-division duplex ("FDD") communication system, the user equipment measure characteristics of their communication channels, partition the available N sub-channels into K parts, and then signal the associated segment information to the access point/base station. The user equipment may use whatever criterion they desire when determining the segments (e.g., closed-loop conditional capacity optimization, utility function optimization, etc.). The access point/base station executes the process with the given segment information. The allocated segments are used in downlink. In an uplink for the FDD communication system, the user equipment may either share their segment information with each other using device-to-device communications or broadcasting, or the access point/base station may run the process using per-user equipment utility functions (user equipment may have previously made it known to the access point/base station, or let the access station/base station independently define it). Communication channel knowledge is typically at the base station.

In time-division duplex ("TDD") communication system, the process can be run either at the base station or at user equipment. By default, the user equipment estimate their own N sub-channels probing (received pilot channels) and signal the segment information to other user equipment or to the access point/base station. The segment information defines the channel allocation that is used both in the uplink and downlink. Of course, the segments may be of different length and/or in different dimensions in any communication system.

From the set of all of the user equipments' first leftmost or lowest markers, wherein each first marker designates a respective user equipment's first 'fair' share, the sub-channels to the left of that first marker are allocated to the respective user equipment associated with that first leftmost or lowest marker as that user equipment's first allocated segment (or first user-defined segment). The first user equipment and its segments are then removed from the channel allocation process, and the process continues with the remaining user equipment.

The process now is directed to a second user-defined segment as determined by a second set of markers of the remaining user equipment. From the second set of all of the user equipments' second markers (except the second marker of the first user equipment which has been removed from the collection of markers), each marker designating a respective user equipment's second 'fair' share, the sub-channels to the left of that second marker are allocated to the respective user equipment associated with that second leftmost or lowest marker. This second user equipment and its segments are now removed from the channel allocation process and the process is repeated for the third user equipment, etc., up to the next-to-the-last user equipment. The sub-channels to the right of the rightmost or last marker are finally allocated to the last user equipment.

Although the process described above refers to leftmost and rightmost markers, the sense of the markers can obviously be reversed, or can be ordered from a lowest to highest, etc., in an operational embodiment, and such equivalence will generally be assumed herein. There may be remaining, unallocated sub-channels (if left and right markers of different user equipment do not coincide), and these remaining sub-channels can be divided among neighboring segments as desired using, for instance, a deterministic allocation scheme, or these sub-channels can be used or reserved for some other purpose. Advantageously, there is no need for use of a fairness index because each user equipment constructs its own segment information (e.g., markers). Also, the user-defined segments need not be of equal length. Typically, the segments are unequal in length perhaps unless a signaling load is to be reduced by the communication system. The process of constructing segment information is thus adaptable to communication systems wherein different user equipment have different communication resource needs.

Turning now to FIGS. 7 to 10, illustrated are block diagrams of an exemplary communication channel demonstrating a process to partition a number of sub-channels according to the principles of the present invention. The sub-channels are linearly arranged in a sequence of sub-channels, (e.g., in increasing order) 1, 2, . . . 10 in the communication channel that may be allocated to K=3 user equipment ("UE"), UE1, UE2, UE3. The parameter κ may include virtual user equipment as described later hereinbelow. Sub-channels 1-10 may represent, for example, time slots, frequency slots, or spatial sub-channels (e.g., orthogonal beams). For simplicity, assume that the endpoints of the sub-channels to be allocated are known and are common for all the user equipment. Then, it is sufficient to signal only K−1 markers. To execute the process introduced herein for a fair allocation of the sub-channels, the access point/base station accumulates and transmits the number K=3 to the three user equipment.

Knowing there are three user equipment attempting to access the communication channel, the first user equipment UE1 transmits K−1=2 markers (first and second markers 711, 721) to the access point/base station to partition the 10 sub-channels into the first user equipment's preferred sub-channel sequences or user-defined segments (sub-channels 1-3, 4-7, 8-10). From the above, sub-channels 1-3 represent the first user equipment-first user-defined segment, sub-channels 4-7 represent the first user equipment-second user-defined segment and sub-channels 8-10 represent the first user equipment-third user-defined segment. The second user equipment UE2 transmits first and second markers 712, 722 to the access point/base station to partition the 10 sub-channels into the second user equipment's preferred sub-channel sequences or user-defined segments (sub-channels 1-2, 3-8, 9-10). From the above, sub-channels 1-2 represent the second user equipment-first user-defined segment, sub-channels 3-8 represent the second user equipment-second user-defined segment and sub-channels 9-10 represent the second user equipment-third user-defined segment. The third user equipment UE3 transmits first and second markers 713, 723 to the access point/base station to partition the 10 sub-channels into the third user equipment's preferred sub-channel sequences or user-defined segments (sub-channels 1-3, 4-9, 10). From the above, sub-channels 1-3 represent the third user equipment-first user-defined segment, sub-channels 4-9 represent the third user equipment-second user-defined segment and sub-channel 10 represents the third user equipment-third user-defined segment. The user equipment may transmit other segment information to the access point/base station.

Figure 7:
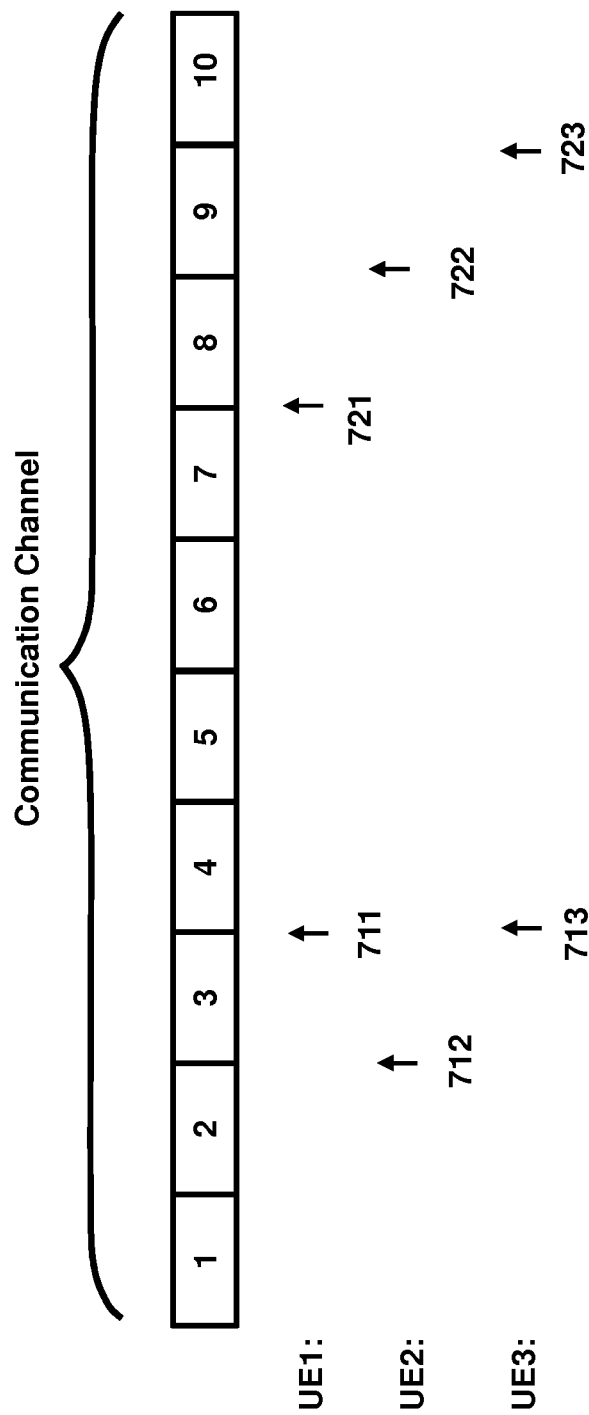
FIGS. 7 to 10 illustrated block diagrams of an exemplary communication channel demonstrating a process to partition a number of sub-channels according to the principles of the present invention.
Figure 8:
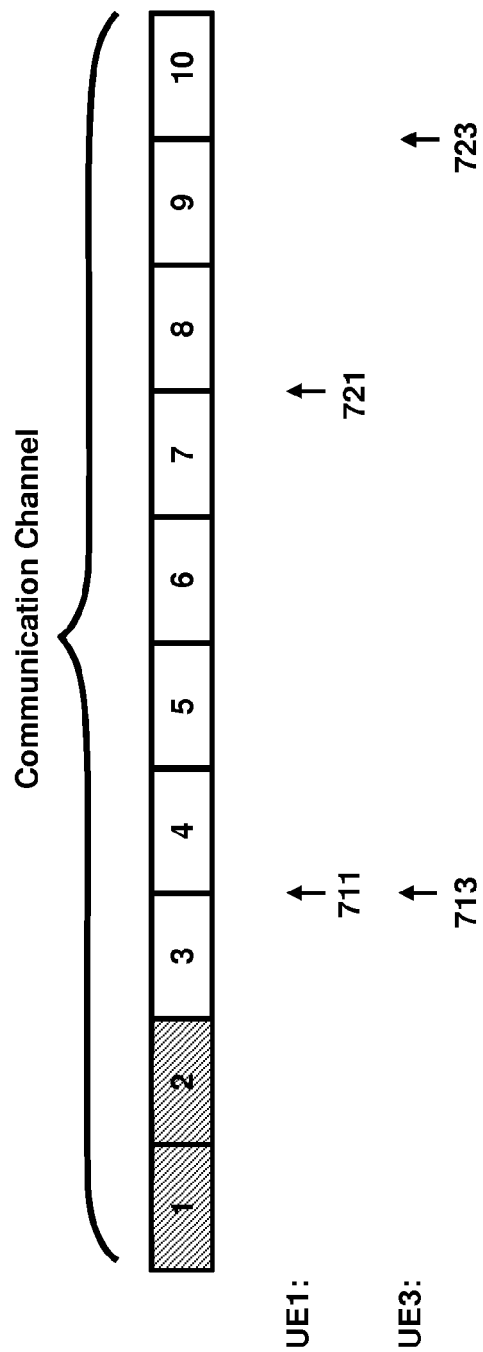
Figure 9:
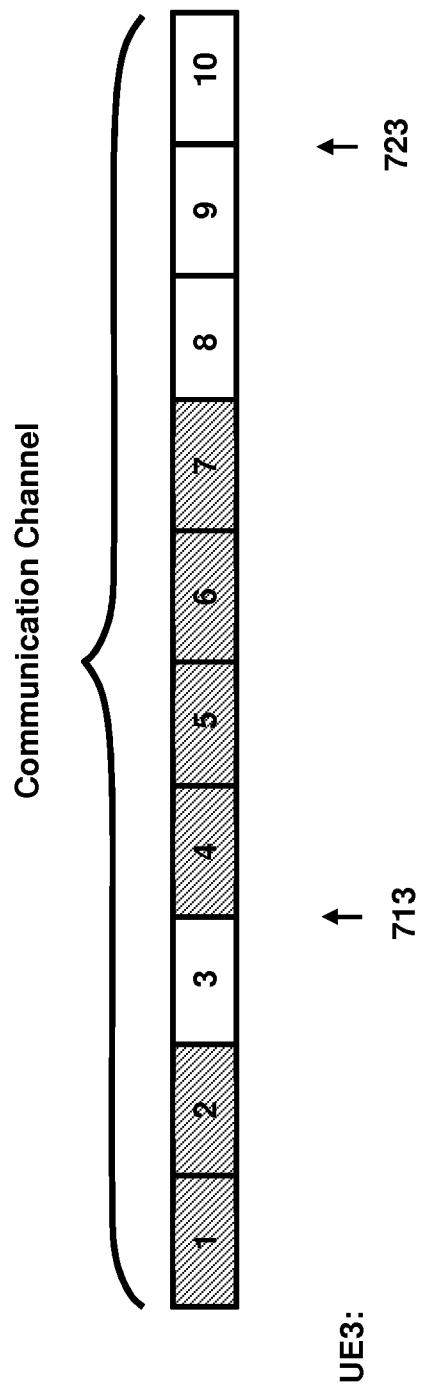

As illustrated in FIG. 7, the lowest or leftmost of the first markers is the first marker for the second user equipment UE2 and, as a result, sub-channels 1-2, which represent the second user equipment-first user-defined segment, are allocated to the second user equipment (as indicated by crosshatching of sub-channels 1-2 in FIG. 8). Thereafter, the remaining user-defined segments for the second user equipment UE2 are removed from the unallocated number of sub-channels. (See FIG. 8). If two or more user equipment select the same segment information (e.g., one or more select the same marker position), the access point/base station may allocate the segment 'pseudo-randomly' to one of the user equipment. Alternatively, the selection can be based on relative channel quality. The access point/base station may request additional information from such user equipment (e.g., a channel quality indicator) and allocate the segment to the user equipment that has the highest or most optimal channel quality indicator in terms of criteria used to compute the channel quality indicator.

As illustrated in FIG. 8, the lowest or leftmost of the second markers for the first and third user equipment UE1, UE3 is the second marker for either the first or third user equipment UE1, UE3. In the instant case, sub-channels 4-7, which represent the first user equipment-second user-defined segment, are allocated to the first user equipment (as indicated by crosshatching of sub-channels 4-7 in FIG. 9). Thereafter, the remaining user-defined segments for the first user equipment UE are removed from the unallocated user equipment. (See FIG. 9). With the first and second user equipment UE1, UE2 allocated one of its user-defined segments, the third user equipment UE3 is allocated sub-channel 10 (representing the third user equipment-third user-defined segment), which lies to the right of the second marker of the third user equipment UE3 (as indicated by crosshatching of sub-channel 10 in FIG. 10).

Figure 10:
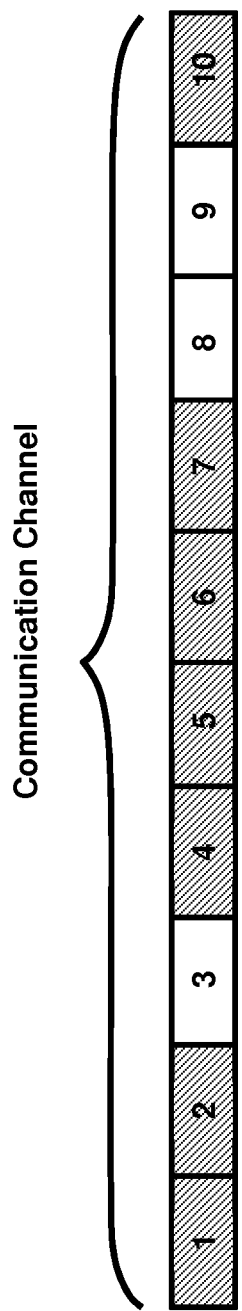

As illustrated in FIG. 10, sub-channels 3, 8 and 9 have not been allocated. These unallocated sub-channels or a portion thereof can be allocated among the three user equipment by, for instance, a deterministic choice, or they can all be left unallocated. Nonetheless, each user equipment has been assigned at least one of its respective preferred user-defined segments. Obviously, the aforementioned process may be employed for any number of user equipment partitioning the sub-channels into any number of segments.

If the user equipment have different throughput needs, a user equipment k requiring more than a 1/K share of segments of the K user equipment can be represented to the system as $P\_k$ (k=1 ..., K) virtual user equipment, and the markers or other segment information can be sent accordingly. In this case, user equipment requiring additional communication resources signal the number (e.g., an integer) $P\_k$ (k=1 ..., K) to the access point/base station to indicate the number of segments requested. The total number $Pt=sum(P\_k)$ of virtual user equipment is accumulated and communicated to the other user equipment of the communication system. Then, the markers are computed for the Pt number of user equipment instead of for K user equipment. This can be implemented, for example, so that a user equipment that requests $P\_k=3$ segments executes the process described above without being removed from the process until three segments are allocated to the user equipment. In this process, if neighboring sub-channels correlate, the segments allocated to user equipment are typically consecutive. Having consecutive segments reduces the signaling required to designate marker positions. Correlated sub-channels refer to sub-channels whose value or utility is similar with the neighboring (or other selected) sub-channels. For example, the correlated sub-channels may refer to channel coherence frequency or channel coherence time, or to correlation between different beams, which in turn relate to frequency-selectivity, Doppler spread, or to structured multi-antenna channels, respectively.

Alternatively, if all of the user equipment request two shorter segments, the sub-channels can be partitioned (e.g., divided) into two sets of sub-channels, and separate markers can be sent for both (or for each). This is useful if a sub-channel is not correlated (e.g., a frequency-selective channel), in which case optimal segment lengths are shorter. As an example, if user equipment k among the K user equipment now has one segment, but user equipment k wants $P\_k-1$ additional segments (i.e., altogether $P\_k$ segments), then user equipment k signals two sets of markers or other segment information as if user equipment k represented $P\_k$ user equipment instead of one. In practice, this means that user equipment k is not removed right after the user equipment k is assigned a first user-defined segment, but remains in the process with the remaining markers for $P\_k$ allocation periods.

Figure 11:
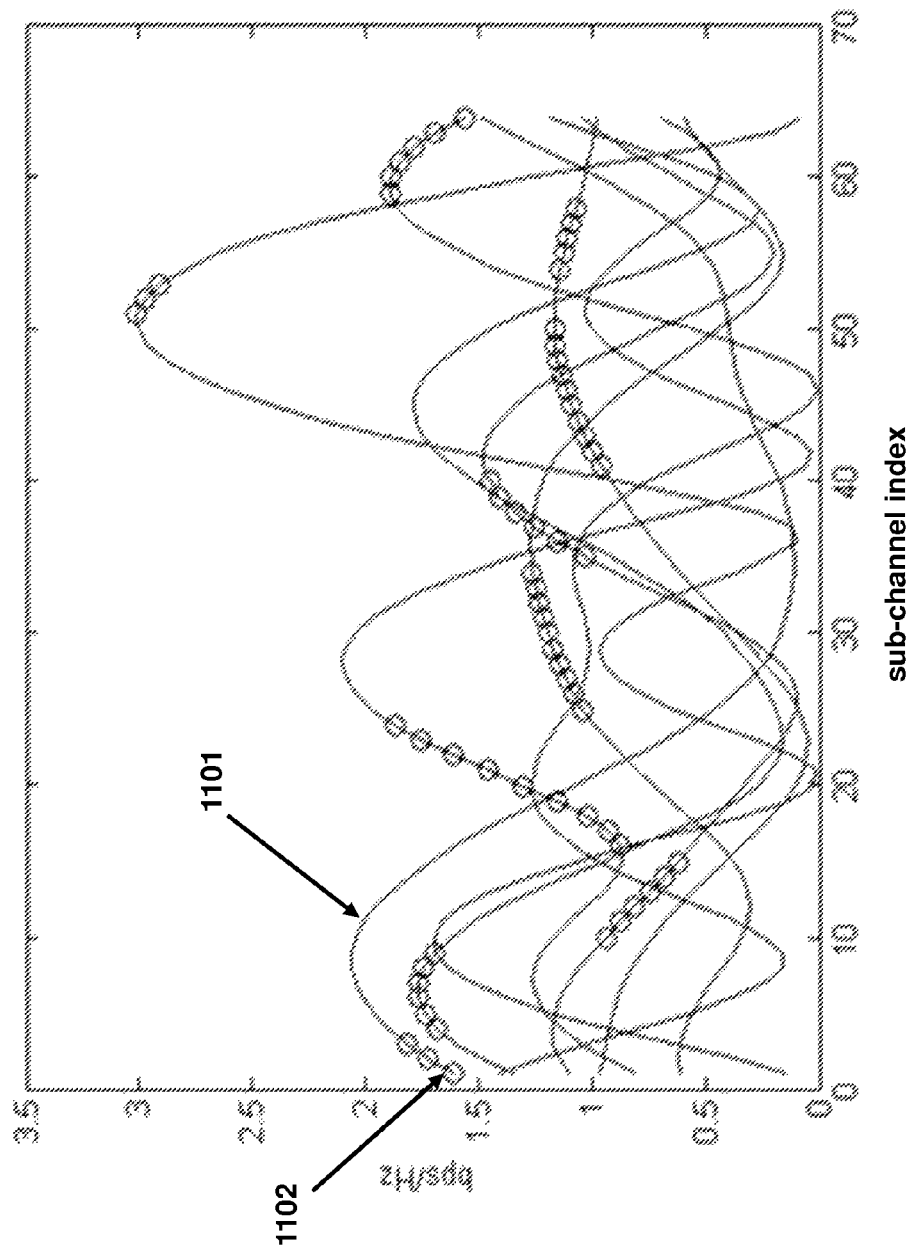
FIG. 11 illustrates a graphical representation of an exemplary channel capacity for a plurality of user equipment that provides an environment for application of the principles of the present invention.

Turning now to FIG. 11, illustrated is a graphical representation of an exemplary channel capacity for a plurality of user equipment (K=8 user equipment) that provides an environment for application of the principles of the present invention. The illustrated embodiment demonstrates for K=8 user equipment a dual allocation in the presence of a four-path channel (L=4 identifies the number of multi-paths for each user equipment). The channel capacity is measured along the vertical axis in bits per second per hertz (bps/Hz) of channel bandwidth and is represented by a respective curved line for each of eight user equipment such as curved line 1101 for a first user equipment. A sub-channel index is measured as shown along the horizontal axis of the FIGURE. Each sub-channel allocated to a user equipment is represented by a small circle, such as sub-channel 1 allocated to the first user equipment indicated by the small circle 1102.

All of the user equipment ("UE") request a dual allocation of two segments. In this example, each user equipment is allocated one row with two segments. The third user equipment gets two separated segments, segments [10 15] and [35 40], and so does the fourth user equipment, but all of the other user equipment are allocated consecutive segments (since the sub-channels still correlate with L=4). Table I below lists the sub-channels allocated to each user equipment.

TABLE I

| UE | First beginning sub-channel | First ending sub-channel | Second beginning sub-channel | Second ending sub-channel |
| --- | --- | --- | --- | --- |
| 1 | 1 | 2 | 3 | 3 |
| 2 | 4 | 7 | 8 | 9 |
| 3 | 10 | 15 | 35 | 40 |
| 4 | 41 | 50 | 54 | 58 |
| 5 | 25 | 32 | 33 | 34 |
| 6 | 51 | 51 | 52 | 53 |
| 7 | 59 | 61 | 62 | 64 |
| 8 | 16 | 22 | 23 | 24 |

Figure 12:
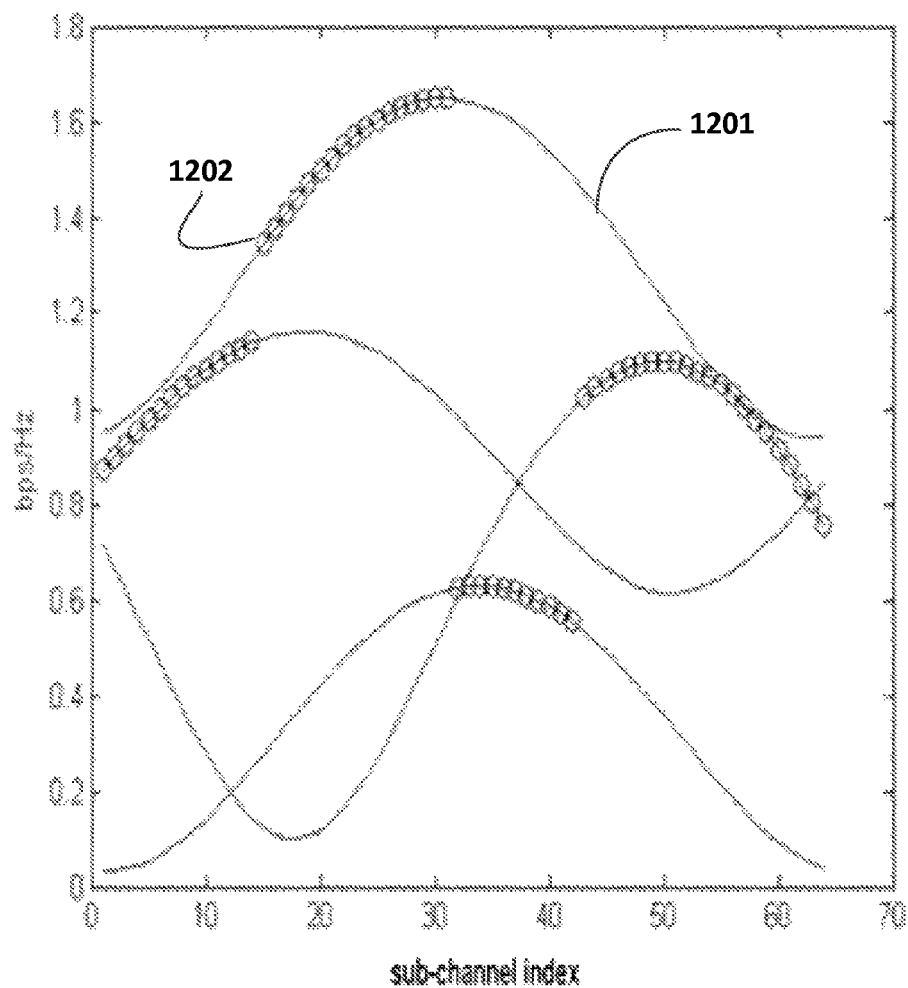
FIGS. 12 and 13 illustrated graphical representations of exemplary segment allocations for a plurality of user equipment according to the principles of the present invention.
Figure 13:
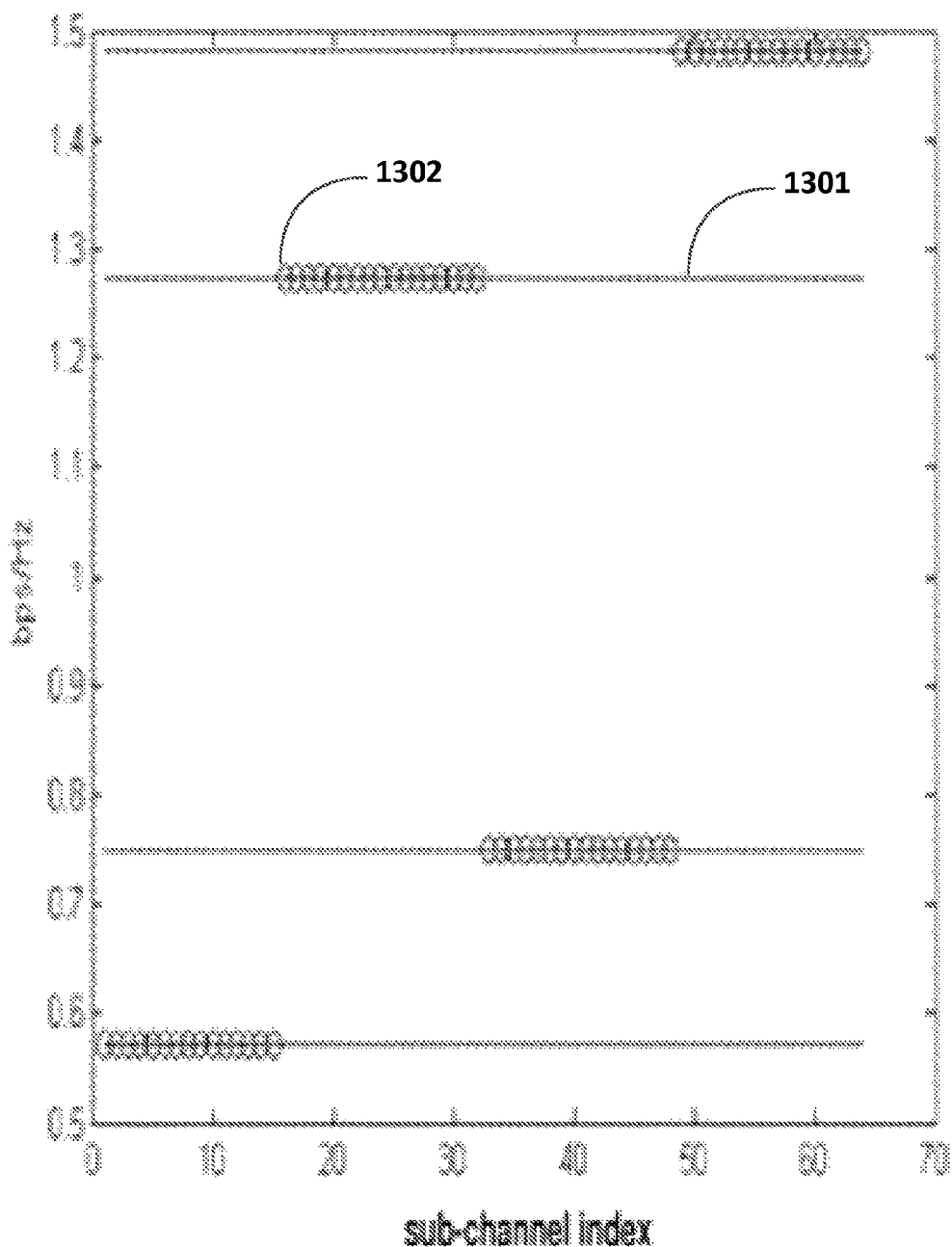

Turning now to FIGS. 12 and 13, illustrated are graphical representations of exemplary segment allocations for a plurality of user equipment (K=4user equipment) according to the principles of the present invention. As illustrated in FIG. 11, channel capacity in each of these FIGURES is represented along the vertical axis and sub-channel index along the horizontal axis. Each of the four curved lines illustrates variation of channel capacity as a function of sub-channel index for each of the four user equipment in accordance with 64 sub-channels. In FIG. 12, a two-path frequency-selective channel is represented by the roughly sinusoidal shape of the curves (with larger correlation between neighboring sub-channels when compared with L=4case), such as curved line 1201 for a first user equipment. Each sub-channel allocated to the first user equipment is represented by a small circle, such as 1202. Different length segments are illustrated and low channel values are avoided by the allocation process due to the inherent mechanism of the sub-channel allocation process. In FIG. 13, a flat channel is represented by the straight lines. Thus, in FIG. 13, the curves are flat (i.e., L=1) and there is no performance gain obtainable by differently allocating the sub-channels. All allocated segments are of similar length. Line 1301 represents a channel of a first user equipment, and 1302 represents a sub-channel allocated to the first user equipment.

Figure 14:
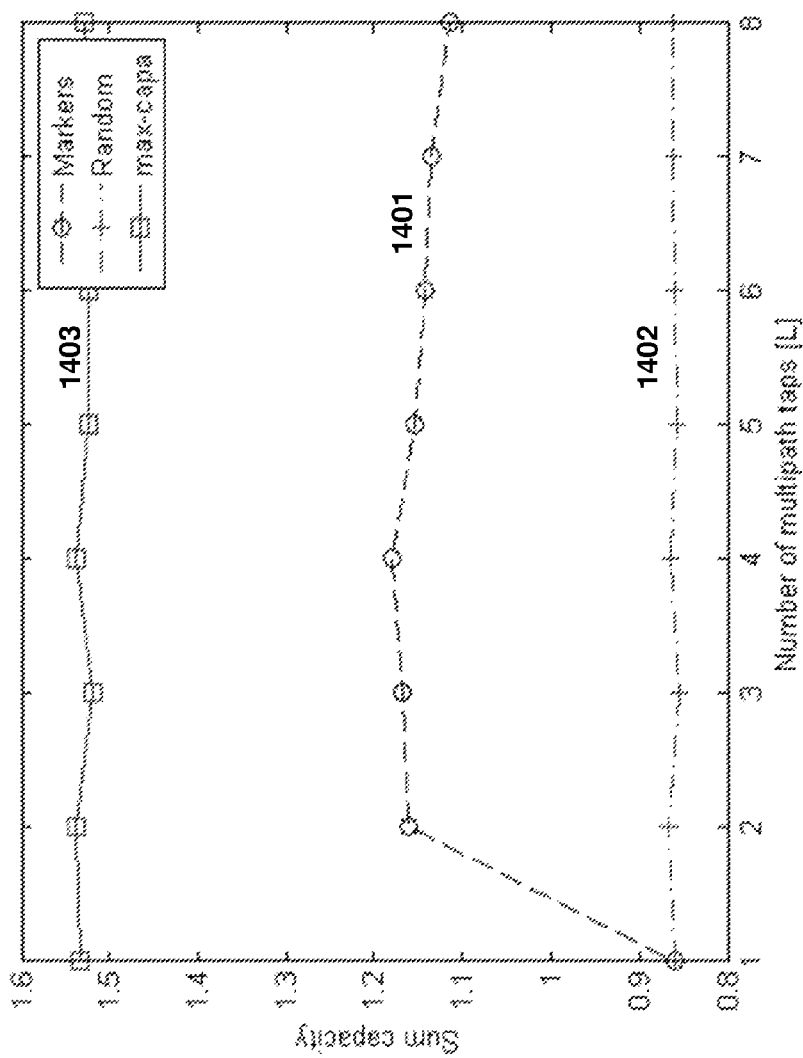
FIG. 14 illustrates a graphical representation of an exemplary sum channel capacity for a plurality of user equipment that provides an environment for application of the principles of the present invention.

Turning now to FIG. 14, illustrated is a graphical representation of an exemplary sum channel capacity for a plurality of user equipment (K=4 user equipment) that provides an environment for application of the principles of the present invention. As demonstrated herein, the sum channel capacity for four user equipment is compared using an embodiment according to the proposed allocation procedure (curve 1401), a random segment allocation procedure with equal share per user equipment (curve 1402), and a maximum capacity sub-channel allocation procedure wherein a preferred sub-channel is allocated to a user equipment without taking into account fairness (curve 1403). The curves represent summed channel capacity along the vertical axis and the number of multi-path taps along the horizontal axis.

Alternative embodiments are now discussed wherein the parameters in the discussion below represent the case that one user equipment seeks $P\_k$ segments (i.e., $(P\_k)-1$ additional segments) and the other user equipment seek one segment. Originally, there are K user equipment and each is allocated about 1/K of the total number of segments. If one user equipment becomes $P\_k$ user equipment (i.e., $P\_k-1$ virtual user equipment are added), then there are collectively $K+(P\_k)-1$ virtual user equipment. The one "hoarding" user equipment that is requesting additional segments then gets a fraction $P\_k/(K+(P\_k)-1)$ of the segments, and the other user equipment are allocated the fraction $1/(K+(P\_k)-1)$ of the segments.

Using K=4 user equipment and $P\_k=3$ for one user equipment identified as user equipment k, the user equipment k requesting $P\_k$ segments is allocated a portion (3/6) of the segments, whereas in the original case each user equipment is allocated (1/4) of the segments. Thus, (3/6)/(1/4) is a two-fold increase in the share for the one user equipment with $P\_k=3$, while the other equipment are allocated a reduced fraction (1/6)/(1/4)=2/3 of an equally distributed allocation. The user equipment that request more segments than other user equipment can take a priority penalty for later channel allocation instants. That is, an access point/base station (or scheduler) can maintain long term statistics on fairness among user equipment and if one desired at any given instant more than its fair share, it is allocated less later on. Thus, the procedure can also be used over multiple uses of the method, so that for any given user equipment, allocation in one segment affects priority in later uses of the method. Furthermore, to enforce fair designation of segments, the user equipment can either send them all at once to an access point/base station (or scheduler). Alternatively, the system may enforce that user equipment can send segments sequentially, but so that they need to be computed (and not allowed to be changed) before at least one segment is assigned to a user equipment. This removes the possibility for a user equipment to give erroneous segment lengths simply to acquire the segment.

It can happen that the fair share allocated to one user equipment may be insufficient for needs thereof, and that user equipment may determine that the "fair capacity/utility" is too small to be useful. In this case, that user equipment may opt out of the allocation process, and inform the communication system that it is willing to relinquish all segments to the other user equipment for that allocation. This can be done in a way so that this particular user has higher priority (higher number of virtual user equipment, i.e., increased $P\_k$) for the next run of the process (e.g., at the next time or frequency slot). Each user equipment may then request a particular portion of segments over a number of consecutive user equipment of the process (e.g., averaged over time). This advantageously increases efficiency of the process.

Segment information such as markers can be sent for a thinner grid of sub-channels. For example, with N sub-channels, there can be only N/8 (possible a priori defined segments or N−1 possible marker positions if markers are used) for eight user equipment. These can correspond to resource block sizes of the communication system. For example, if the communication system can only send 12 sub-channels (at minimum) then the marker positions can be set accordingly for the finer grid. In this case, the user equipment can compute the markers as before, and then quantize them to a predefined grid, or the markers can be initially computed for the grid. The marker position can be sent, for instance, using run-length encoding.

The process for allocation of communication resources is directly applicable for fairly scheduled access to communication resources when request needs are communicated in separate (non-colliding) channels (e.g., on a common pilot or similar channel), and where the allocator (e.g., an access point/base station) receives the segment information from each communication node (or user equipment). In a distributed implementation, the segment information can be relayed to a set of other communication nodes (or user equipment) in the communication system using any given broadcast/mesh protocol (e.g., Nokia's AWARENET protocol), or possibly using a different wireless communication system. The process should be applied to communication nodes that are within an interference distance from each other (i.e., a distance within which the communication nodes cause significant interference to each other). Otherwise, bandwidth is not used efficiently, which is a similar issue to having too great a frequency reuse pattern in a communication system. Naturally, if the allocator(s) does not receive all of the segment information of a given communication node then this communication node is not operable in the process and does not receive any segment allocations. The segment information should be identifiable such that the communication system can determine which allocator handles the respective communication node.

Rather than signaling all of the segment information at once (in one burst), each user equipment can send their first segment information at a first signaling interval, followed by a first segment allocation, and then the second segment information, followed by a second segment allocation. This reduces the signaling load somewhat because there is one fewer user equipment to signal after each round of the process. In this case, it is also beneficial for each user equipment to report the segment information honestly. With too small a marker, for instance, a user equipment faces the possibility of obtaining fewer than 1/K of the segments.

Figure 15:
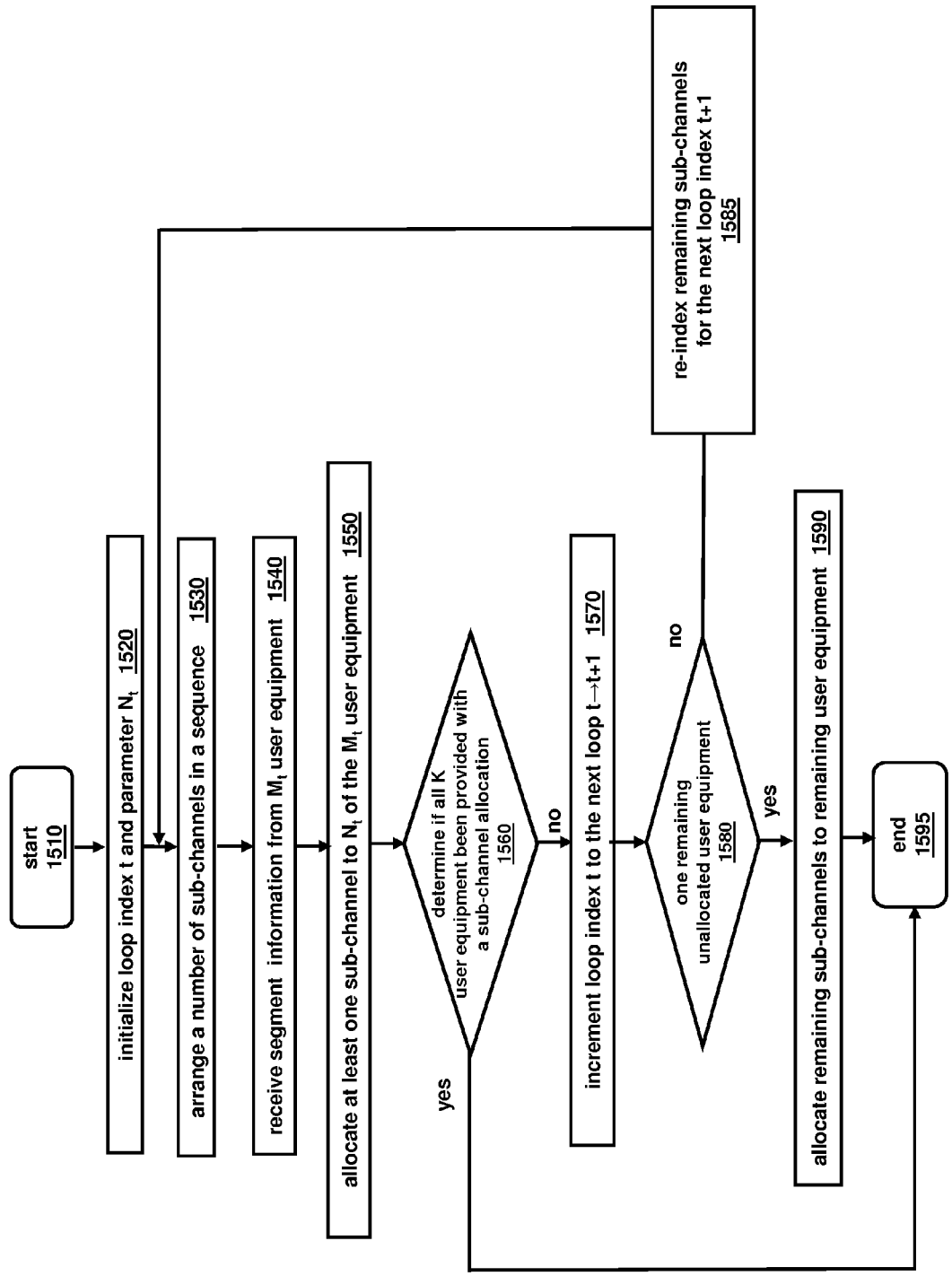
FIGS. 15 and 16 illustrate flowcharts demonstrating exemplary methods of operating a base station according to the principles of the present invention.

Turning now to FIG. 15, illustrated is a flowchart demonstrating an exemplary method of operating a base station (or other communication element such as an access point) to allocate sub-channels to a plurality K of user equipment according to the principles of the present invention. The method starts at a step or module 1510. In a step or module 1520, a loop index t is initialized to the value 1, and a parameter $N_t$ is initialized to the value 0. The parameter t is a loop iteration parameter for allocating sub-channels, and the parameter $N_t$ represents the number of user equipment that will be assigned communication resources in the current loop. The parameter $N_{t-1}$ represents the number of user equipment that were assigned communication resources in the previous loop. The parameter $N_t$ may include virtual user equipment.

In a step or module 1530, a number of sub-channels that are allocable to at least one of a plurality of user equipment are arranged in a sequence according to an index. In a step or module 1540, the base station in loop index t receives segment information from a remaining number $M_t$ of user equipment to partition the number of sub-channels into at least two user-defined segments, where $M_t \leq K - \text{sum}(N_0 + \ldots + N_{t-1})$ [i.e., the remaining number $M_t$ of unallocated user equipment is less than the total number K of user equipment minus the number of user equipment allocated during previous loops]. In an embodiment, the base station may be configured to receive segment information to partition the number of sub-channels into at least one additional segment for each of the plurality of user equipment to represent a virtual user equipment (i.e., the parameter K may include virtual user equipment). The user-defined segments may include different numbers of sub-channels.

In a step or module 1550, the base station in loop index t allocates at least one sub-channel to $N_t$ of the remaining $M_t$ user equipment using segment length information of the at least two user-defined segments. In loop 1, for example, the base station may allocate a first user equipment-first user-defined segment including at least one sub-channel to a first user equipment of the plurality K of user equipment. The base station may allocate the sub-channel(s) dependent on the first user-defined segment to the first user equipment, when the first user-defined segment includes fewer sub-channels than the other user-defined segments from the plurality K of user equipment.

In a step or module 1560, the base station determines if all K user equipment have been provided with a sub-channel allocation [i.e., is sum $(N_0+N_1+ \ldots +N_t)<K$]. If sum $(N_0+N_1+ \ldots +N_t)<K$, then there is at least one user equipment remaining. If all K user equipment have been provided with a sub-channel allocation, then the method ends in step or module 1595. Otherwise, in a step or module 1570, the base station increments the loop index t to the next loop (i.e., t is incremented to t+1). In a step or module 1580, the base station determines if there is only one remaining unallocated user equipment. If there are more than one remaining unallocated user equipment, then, in step or module 1585, the base station re-indexes the remaining sub-channels for the next loop index t+1 and returns to step or module 1530. If there is only one remaining unallocated user equipment, then, in step or module 1590, the base station allocates the remaining sub-channels to the remaining user equipment dependent on the remaining user equipment's user-defined segment, and the method ends in step or module 1595.

If there are more than one user equipment remaining in step or module 1585, the base station may remove the user-defined segments from the first user equipment from the number of sub-channels and re-index the remaining sub-channels recognizing that there is now at least one fewer unallocated user equipment, and return to step or module 1530. In other words, the base station may rearrange a remaining number of sub-channels in a sequence according to an index, and the user equipment may re-send their segment information to the base station.

For re-indexing, sub-channels may be shuffled (and the same for all user equipment) to obtain enhanced performance. As an example, all user equipment may compute next segment information (or a first marker for remaining sub-channels) using a number of cyclic shifts of their own sub-channels. Each user equipment may select a shift N*_k that results in the smallest next segment, and send that to the base station. The base station collects segment information with the re-indexing, and the sub-channels may be allocated to the user equipment with the smallest proposed segment length. The adopted cyclic shift N*_k is signaled by the base station to all of the user equipment, and they may shift their segment information (e.g., marker) indices accordingly.

Figure 16:
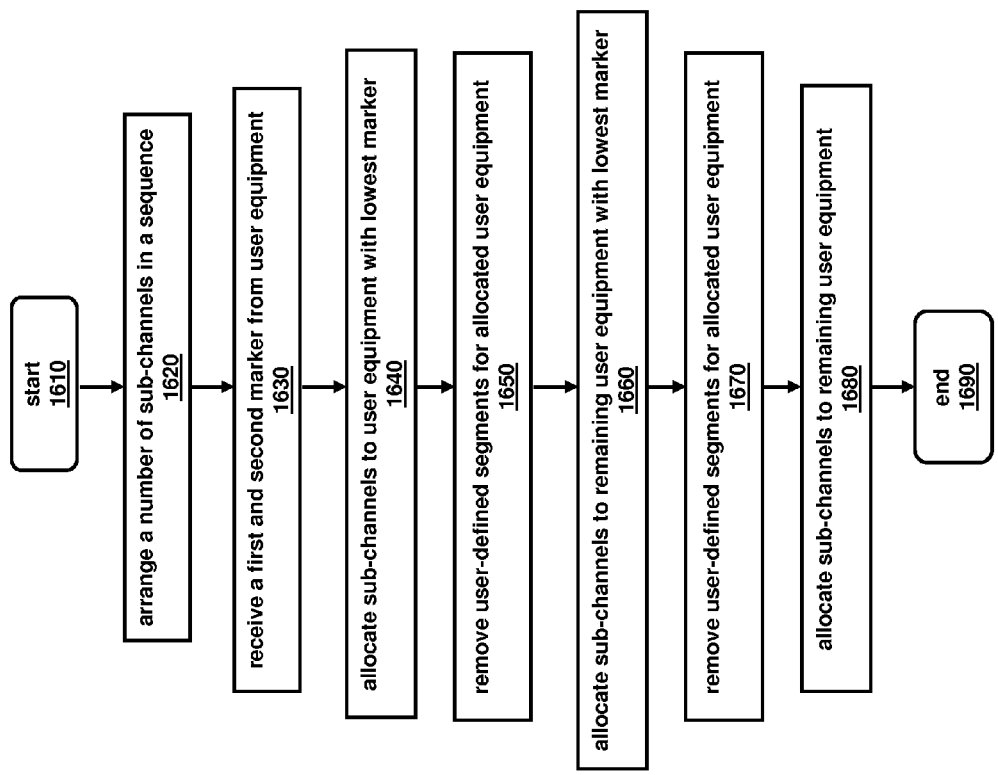

Turning now to FIG. 16, illustrated is a flowchart demonstrating an exemplary method of operating a base station (or other communication element such as an access point) according to the principles of the present invention. The method starts at a step or module 1610. In a step or module 1620, the base station is configured to arrange a number of sub-channels in a sequence according to an index allocable to at least one of a plurality of user equipment. In the exemplary embodiment, the method will be described with respect to a first user equipment, a second user equipment and a third user equipment. In a step or module 1630, the base station is configured to receive first segment information (e.g., a first marker) and second segment information (e.g., a second marker) from the first user equipment to partition the number of sub-channels into a first user equipment-first user-defined segment, a first user equipment-second user-defined segment, and a first user equipment-third user-defined segment. The base station is also configured to receive first segment information (e.g., a first marker) and second segment information (e.g., a second marker) from the second user equipment to partition the number of sub-channels into a second user equipment-first user-defined segment, a second user equipment-second user-defined segment, and a second user equipment-third user-defined segment. The base station is also configured to receive first segment information (e.g., a first marker) and second segment information (e.g., a second marker) from the third user equipment to partition the number of sub-channels into a third user equipment-first user-defined segment, a third user equipment-second user-defined segment, and a third user equipment-third user-defined segment.

In a step or module 1640, the base station is configured to allocate sub-channels to the user equipment with the leftmost or lowest marker. Assuming that the first marker from the first user equipment is lower than or at least as low as the first marker from the second user equipment and the first marker from the third user equipment, then the base station is configured to allocate sub-channels dependent on the first user equipment-first user-defined segment to the first user equipment. Thereafter, the remaining user-defined segments for the first user equipment are removed from the unallocated number of sub-channels in a step or module 1650.

In a step or module 1660, the base station is configured to allocate sub-channels to the remaining user equipment with the leftmost or lowest marker. Assuming that the first markers of the second and third user equipment pertain to sub-channels allocated to the first user equipment and the second marker from the second user equipment is lower than or at least as low as the second marker from the third user equipment, then the base station is configured to allocate sub-channels dependent on the second user equipment-second user-defined segment to the second user equipment. Thereafter, the remaining user-defined segments for the second user equipment are removed from the unallocated number of sub-channels in a step or module 1670.

In a step or module 1680, the base station is configured to allocate sub-channels to the remaining user equipment. In this case, with the first and second user equipment allocated the first user equipment-first user-defined segment and the second user equipment-second user-defined segment, respectively, the third user equipment is allocated the third user equipment-third user-defined segment, which lies to the right or is greater than the second marker from the third user equipment. The method then ends in a step or module 1690.

It should be understood that the aforementioned exemplary embodiment can be contracted or expanded to cover any number of user equipment and can be modified to follow a sequential approach to receive the segment information. As an example, the base station may receive segment information from a plurality of use equipment and allocate to one user equipment based on the user-defined segment with the fewest number of sub-channels. The base station could then remove the allocated user equipment's user defined segments and allocated sub-channels from the process and arrange the remaining number of sub-channels into a sequence based on an index and request new segment information from the remaining user equipment and begin the process for the allocation again. This, of course, would continue until all of the user equipment are allocated sub-channels based on the user-defined segments.

Figure 17:
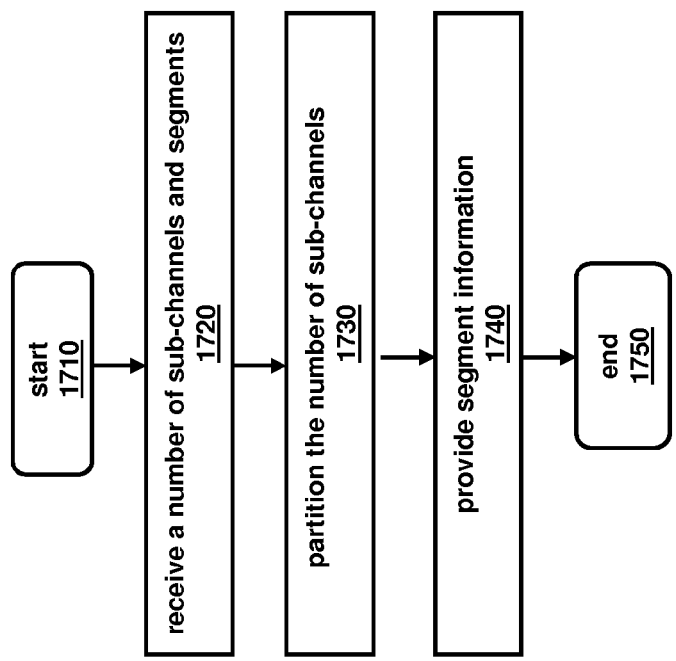
FIG. 17 illustrates a flowchart demonstrating an exemplary method of operating a user equipment according to the principles of the present invention.

Turning now to FIG. 17, illustrated is a flowchart demonstrating an exemplary method of operating a user equipment (or other communication node) according to the principles of the present invention. The method starts at a step or module 1710. In a step or module 1720, the user equipment is configured to receive a number of sub-channels and segments allocable to the user equipment. In step or module 1730, the user equipment partitions the number of sub-channels into a first user-defined segment and a second user-defined segment. In an embodiment, the user equipment is configured to partition a number of sub-channels according to a priority thereof, which may be a function of processed sub-channel characteristics. The sub-channel characteristics may include a performance indicator of the number of sub-channels. In step or module 1740, the user equipment provides segment information such as markers that indicates the partition into the first user-defined segment and the second user-defined segment. The segment information may include an additional number of segments in which to partition the number of sub-channels. The method ends in a step or module 1750.

An advantage of the process introduced herein is its simplicity. Markers or other segment information and a number of virtual user equipment is advantageously provided to a communication element such as a base station. The process can be tuned for any criterion user equipment may impose. Different user equipment can even have different criteria for determining the segments. Hence, the process is highly versatile and adaptable. For example, with capacity-fair markers, the process tends to find capacity-efficient sub-channel allocations over multiple user equipment, since the "leftmost" or lowest markers belong to user equipment with the most efficient sub-channel segments among the remaining user equipment. In tests, the process typically gives an estimated 30 percent increase in capacity over random allocation, as shown by FIG. 14. The process is applicable when segment lengths are shorter than channel coherence time or frequency when time or frequency slots are assigned, respectively. With very long segments, it becomes more difficult to 'ride the peak' of the sub-channels, or to avoid the poor sub-channels. This means in practice if sub-channel quality varies a lot (e.g., after every four sub-channel segments), but one can only assign 16 length segments, there are typically also poor sub-channels in each allocated segment. The process can also use interference information (due to the same K user equipment, or due to out-of-cell user equipment) by including that consideration in the criteria employed by the user equipment for setting the marker indexes or other segment information that determines the segments. It is noted that a communication system may impose constraints on segment lengths.

Program or code segments making up the various embodiments of the present invention may be stored in a computer readable medium or transmitted by a computer data signal embodied in a carrier wave, or a signal modulated by a carrier, over a transmission medium. For instance, a computer program product including a program code stored in a computer readable medium (e.g., a non-transitory computer readable medium) may form various embodiments of the present invention. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, an optical disk, a hard disk, a fiber optic medium, a radio frequency ("RF") link, and the like. The computer data signal may include any signal that can propagate over a transmission medium such as electronic communication network communication channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Also, many of the features, functions and steps of operating the same may be reordered, omitted, added, etc., and still fall within the broad scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising:
   a processor; and
   memory including computer program code,
   said memory and said computer program code configured to, with said processor, cause said apparatus to perform at least the following:
   arrange a number of sub-channels in a sequence according to an index configured to be allocated to at least one of a first user equipment, a second user equipment and a third user equipment;
   receive first segment information from said first user equipment partitioning said number of sub-channels into a first user equipment-first user-defined segment and a first user equipment-second user-defined segment;
   receive first segment information from said second user equipment partitioning said number of sub-channels into a second user equipment-first user-defined segment and a second user equipment-second user-defined segment;
   receive first segment information from said third user equipment partitioning said number of sub-channels into a third user equipment-first user-defined segment and a third user equipment-second user-defined segment; and
   allocate sub-channels dependent on said first user equipment-first user-defined segment to said first user equipment when said first segment information therefrom is lower than said first segment information from said second user equipment and said first segment information from said third user equipment, wherein the first segment information from the first user equipment, the first segment information from the second user equipment, and the first segment information from the third user equipment each comprises one or more markers that partition the number of sub-channels into consecutive segments according to a preference of the first user equipment, the second user equipment, and the third user equipment, respectively.

2. The apparatus as recited in claim 1 wherein said memory and said computer program code are further configured to, with said processor, cause said apparatus to:
   receive second segment information from said second user equipment to partition said number of sub-channels into said second user equipment-second user-defined segment and a second user equipment-third user-defined segment;
   receive second segment information from said third user equipment to partition said number of sub-channels into said third user equipment-second user-defined segment and a third user equipment-third user-defined segment; and
   allocate sub-channels dependent on said second user equipment-second user-defined segment to said second user equipment when said second segment information therefrom is lower than said second segment information from said third user equipment.

3. The apparatus as recited in claim 1 wherein said memory and said computer program code are further configured to, with said processor, cause said apparatus to:
   arrange a number of remaining sub-channels in the sequence according to the index configured to be allocated to at least one of said second user equipment and said third user equipment;
   receive second segment information from said second user equipment to partition said number of remaining sub-channels into another second user equipment-first user-defined segment and another second user equipment-second user-defined segment;
   receive second segment information from said third user equipment to partition said number of remaining sub-channels into another third user equipment-first user-defined segment and another third user equipment-second user-defined segment; and
   allocate said number of remaining sub-channels dependent on said another second user equipment-first user-defined segment to said second user equipment when said second segment information therefrom is lower than said second segment information from said third user equipment.

4. The apparatus as recited in claim 1 wherein said memory and said computer program code are further configured to, with said processor, cause said apparatus to remove said first user equipment-first user-defined segment from said number of sub-channels to obtain a remaining number of sub-channels.

5. The apparatus as recited in claim 1 wherein said memory and said computer program code are further configured to, with said processor, cause said apparatus to remove said first user equipment-first user-defined segment from said number of sub-channels to obtain a number of remaining sub-channels and arrange said number of remaining sub-channels in the sequence according to the index.

6. The apparatus as recited in claim 1 wherein at least one of said first user equipment-first user-defined segment, said first user equipment-second user-defined segment, said second user equipment-first user-defined segment, said second user equipment-second user-defined segment, said third user equipment-first user-defined segment and said third user equipment-second user-defined segment includes a different number of sub-channels.

7. The apparatus as recited in claim 1 wherein said memory and said computer program code are further configured to, with said processor, cause said apparatus to receive additional segment information to partition said number of sub-channels into at least one additional segment for said first user equipment, said second user equipment and said third user equipment, and allocate the at least one additional segment to one of said first user equipment, said second user equipment and said third user equipment.

8. The apparatus as recited in claim 1 wherein said apparatus is embodied in a base station.

9. A method, comprising:
arranging a number of sub-channels in a sequence according to an index configured to be allocated to at least one of a first user equipment, a second user equipment and a third user equipment;
receiving first segment information from said first user equipment partitioning said number of sub-channels into a first user equipment-first user-defined segment and a first user equipment-second user-defined segment;
receiving first segment information from said second user equipment partitioning said number of sub-channels into a second user equipment-first user-defined segment and a second user equipment-second user-defined segment;
receiving first segment information from said third user equipment partitioning said number of sub-channels into a third user equipment-first user-defined segment and a third user equipment-second user-defined segment; and
allocating sub-channels dependent on said first user equipment-first user-defined segment to said first user equipment when said first segment information therefrom is lower than said first segment information from said second user equipment and said first segment information from said third user equipment, wherein the first segment information from the first user equipment, the first segment information from the second user equipment, and the first segment information from the third user equipment each comprises one or more markers that partition the number of sub-channels into consecutive segments according to a preference of the first user equipment, the second user equipment, and the third user equipment, respectively.

10. The method as recited in claim 9, further comprising:
receiving second segment information from said second user equipment to partition said number of sub-channels into said second user equipment-second user-defined segment and a second user equipment-third user-defined segment;
receiving second segment information from said third user equipment to partition said number of sub-channels into said third user equipment-second user-defined segment and a third user equipment-third user-defined segment; and
allocating sub-channels dependent on said second user equipment-second user-defined segment to said second user equipment when said second segment information therefrom is lower than said second segment information from said third user equipment.

11. The method as recited in claim 9, further comprising:
arranging a number of remaining sub-channels in the sequence according to the index configured to be allocated to at least one of said second user equipment and said third user equipment;
receiving second segment information from said second user equipment to partition said number of remaining sub-channels into another second user equipment-first user-defined segment and another second user equipment-second user-defined segment;
receiving second segment information from said third user equipment to partition said number of remaining sub-channels into another third user equipment-first user-defined segment and another third user equipment-second user-defined segment; and
allocating said number of remaining sub-channels dependent on said another second user equipment-first user-defined segment to said second user equipment when said second segment information therefrom is lower than said second segment information from said third user equipment.

12. The method as recited in claim 9 further comprising removing said first user equipment-first user-defined segment from said number of sub-channels to obtain a remaining number of sub-channels.

13. The method as recited in claim 9 further comprising removing said first user equipment-first user-defined segment from said number of sub-channels to obtain a number of remaining sub-channels and arranging said number of remaining sub-channels in the sequence according to the index.

14. The method as recited in claim 9 wherein at least one of said first user equipment-first user-defined segment, said first user equipment-second user-defined segment, said second user equipment-first user-defined segment, said second user equipment-second user-defined segment, said third user equipment-first user-defined segment and said third user equipment-second user-defined segment includes a different number of sub-channels.

15. The method as recited in claim 9 further comprising receiving additional segment information to partition said number of sub-channels into at least one additional segment for said first user equipment, said second user equipment and said third user equipment, and allocating at least one additional segment to one of said first user equipment, said second user equipment and said third user equipment.

16. An apparatus, comprising:
a processor; and
memory including computer program code,
said memory and said computer program code configured to, with said processor, cause said apparatus to perform at least the following:
receive a number of sub-channels and segments configured to be allocated to said apparatus;
partition said number of sub-channels into a first user-defined segment and a second user-defined segment; and
provide segment information to a base station, wherein the segment information indicates said partition into said first user-defined segment and said second user-defined segment, wherein the segment information comprises one or more markers that partition the number of sub-channels into the first user-defined segment and the second user-defined segment according to a preference of the apparatus.

17. The apparatus as recited in claim 16 wherein said apparatus is configured to partition said number of sub-channels according to a priority thereof 18. The apparatus as recited in claim 16 wherein said apparatus is configured to partition said number of sub-channels according to a priority thereof, said priority being a function of processed sub-channel characteristics.

19. The apparatus as recited in claim 18 wherein said processed sub-channel characteristics include a performance indicator of said number of sub-channels.

20. The apparatus as recited in claim 16 wherein said segment information includes an additional number of segments to partition said number of sub-channels.

* * * * *